(12) United States Patent
Takahara

(10) Patent No.: US 8,306,431 B2
(45) Date of Patent: Nov. 6, 2012

(54) OPTICAL TRANSMISSION SYSTEM

(75) Inventor: Tomoo Takahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 281 days.

(21) Appl. No.: 12/754,828

(22) Filed: Apr. 6, 2010

(65) Prior Publication Data
US 2010/0260504 A1 Oct. 14, 2010

(30) Foreign Application Priority Data

Apr. 10, 2009 (JP) ................................. 2009-096220

(51) Int. Cl.
*H04B 10/00* (2006.01)

(52) U.S. Cl. ........ 398/152; 398/188; 398/205; 398/206; 398/184

(58) Field of Classification Search .................. 398/152, 398/140, 188, 183, 184, 205, 206, 154
See application file for complete search history.

(56) References Cited

U.S. PATENT DOCUMENTS

| | | | | |
|---|---|---|---|---|
| 7,532,822 B2 * | 5/2009 | Sun et al. | | 398/155 |
| 7,734,196 B2 * | 6/2010 | Takahara | | 398/208 |
| 7,769,305 B1 * | 8/2010 | Roberts et al. | | 398/206 |
| 7,893,340 B2 * | 2/2011 | Kojima et al. | | 84/615 |
| 7,962,048 B2 * | 6/2011 | Taylor | | 398/202 |
| 7,970,290 B2 * | 6/2011 | Tao et al. | | 398/202 |
| 2003/0147442 A1 * | 8/2003 | Larson et al. | | 372/50 |
| 2004/0218932 A1 * | 11/2004 | Epworth et al. | | 398/202 |
| 2008/0049316 A1 | 2/2008 | Nakamoto et al. | | |
| 2008/0056727 A1 * | 3/2008 | Nishihara et al. | | 398/155 |
| 2008/0205905 A1 * | 8/2008 | Tao et al. | | 398/204 |
| 2008/0232816 A1 * | 9/2008 | Hoshida et al. | | 398/152 |
| 2010/0178065 A1 * | 7/2010 | Nishihara et al. | | 398/202 |
| 2011/0129230 A1 * | 6/2011 | Zanoni et al. | | 398/140 |

FOREIGN PATENT DOCUMENTS

JP 2008-53555 3/2008

* cited by examiner

*Primary Examiner* — Kenneth N Vanderpuye
*Assistant Examiner* — Hibret Woldekidan
(74) *Attorney, Agent, or Firm* — Staas & Halsey LLP

(57) ABSTRACT

An optical transmission system includes an optical transmitter that includes first and second light sources, first and second phase modulators respectively modulating light from the first and the second light sources, and a polarized beam combiner combining the light output from the first and the second phase modulators to output an optical signal; and an optical receiver that includes a local oscillator, a polarization beam splitter splitting, according to polarization, the optical signal transmitted from the optical transmitter, and first and second digital coherent receivers corresponding to the first and the second phase modulators, and including a frontend that mixes light from the local oscillator and the polarization-split optical signal to output an electrical signal of real and imaginary parts, an analog-digital converting unit converting the electrical signal to a digital signal, and a digital signal processing unit estimating phase of the digital signal and extracting a signal.

12 Claims, 20 Drawing Sheets

OPTICAL TRANSMISSION SYSTEM

CROSS REFERENCE TO RELATED APPLICATIONS

This application is based upon and claims the benefit of priority of the prior Japanese Patent Application No. 2009-096220, filed on Apr. 10, 2009, the entire contents of which are incorporated herein by reference.

FIELD

The embodiment discussed herein is related to an optical transmission system that transmits optical signals.

BACKGROUND

Typically, in transmitters used in communication systems, signal noise ratio (SNR) is maintained by increasing the power of the output signal. Transmitters used in optical transmission systems include those that direct modulation laser light and those that use an external modulator. For optical transmitters that use external modulators, the optical power output by a laser diode (LD) serving as a light source, loss at the external modulator, loss through connections to passive devices such as fibers, etc. determine the power of the output signal. Further, wavelength lockers that stabilize the wavelength of light output from LDs used as light sources have been propose such as that disclosed in Japanese Laid-Open Patent Publication No. 2008-53555.

Such conventional technology, however, has a problem in that SNR maintenance for a signal is complicated because reductions in insertion loss at modulators have nearly reached their limits and because of constraints in increasing the power of light output from LDs and in reliability. For example, if schemes such as Dual Polarization Quadrature Phase Shift Keying (DP-QPSK) are adopted, loss from multiplexing and demultiplexing LD light is great.

For example, if DP-QPSK is adopted, since LD light is branched into two to generate polarized optical signals, optical power of the signal drops by at least 3 dB. Further, compared to QPSK, the power of the output signal drops by the amount of the excess loss from the splitter that branches the output from the light source.

Whereas, providing plural LDs on the transmission side to generate polarized optical signals may stabilize the power of the output polarized optical signals, nonetheless, a problem arises in that reception of the polarized optical signals becomes complicated since respective phases and wavelengths of the light output from each of the LDs are not completely identical.

Meanwhile, for example, a homodyne receiver having optical phase locked loops (OPLLs) for each polarized beam may be considered. Nonetheless, problems of increased apparatus size and cost arise as a result of having, on the receiving side, OPLLs that respectively correspond to the LDs on the transmitting side.

SUMMARY

According to an aspect of an embodiment, an optical transmission system includes an optical transmitter and an optical receiver, where the optical transmitter includes a first and a second light source, a first phase modulator that modulates light from the first light source, a second phase modulator that modulates light from the second light source, and a polarized beam combiner that combines the light output from the first phase modulator and the light output from the second phase modulator into an optical signal and outputs the optical signal; and the optical receiver includes a local oscillator, a polarization beam splitter that splits, according to polarization, the optical signal transmitted from the optical transmitter, and a first and a second digital coherent receiver respectively corresponding to the first phase modulator and the second phase modulator, and including a frontend that mixes light from the oscillator and the optical signal split according to polarization by the polarization beam splitter to output an electrical signal of a real part and an imaginary part, an analog-digital converting unit that converts the electrical signal of the real part and the imaginary part output from the frontend to a digital signal, and a digital signal processing unit that performs phase estimation with respect to the digital signal and extracts a signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings. An optical transmission system according an embodiment improves SNR of polarized optical signals by a disposal of plural LDs on the transmission side, and compensates phase shifting occurring among the LDs by executing digital coherent detection that includes phase estimation for each polarization on the receiving side.

Figure 1:
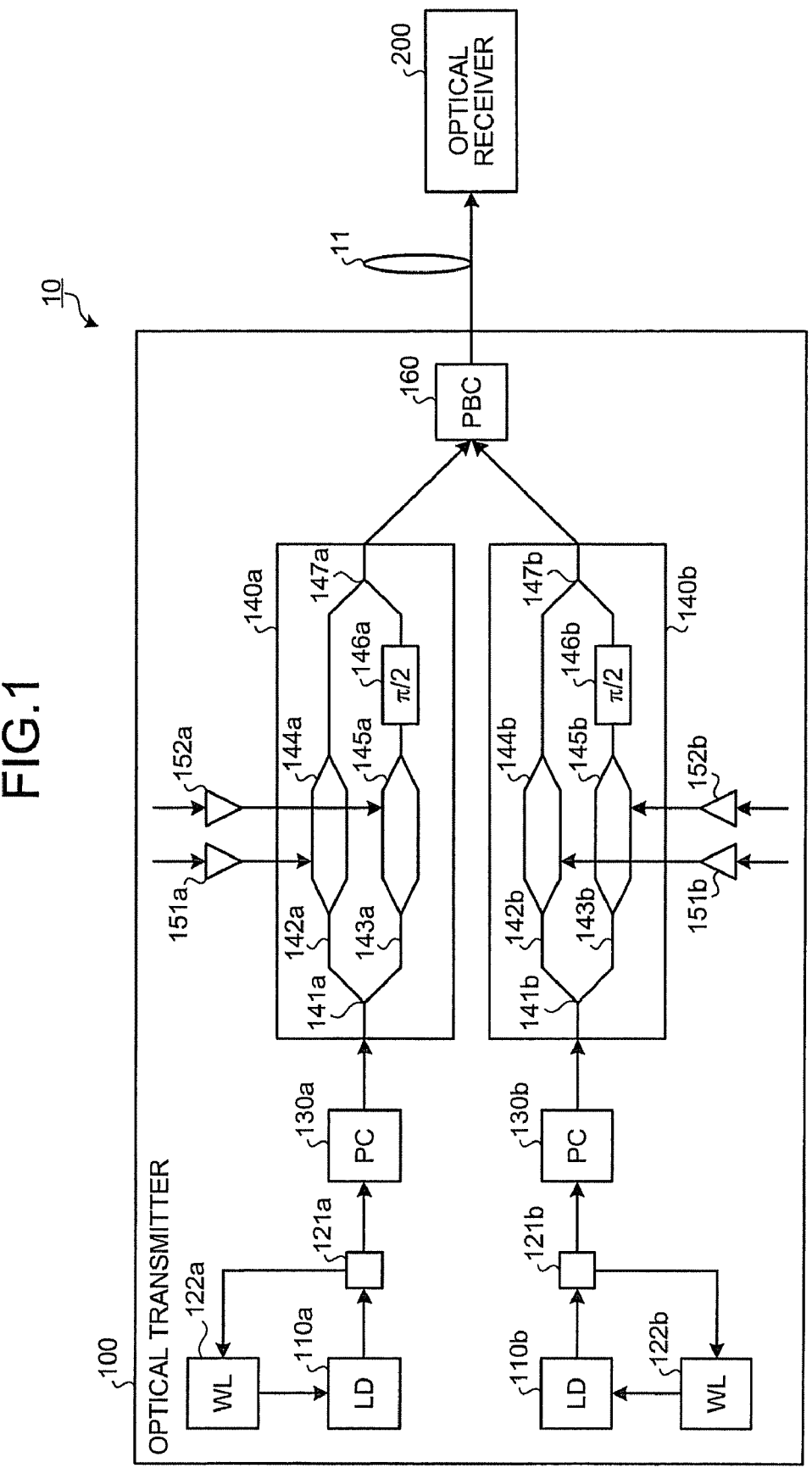
FIG. 1 is a diagram depicting a configuration an optical transmission system according to an embodiment.

FIG. 1 is a diagram depicting a configuration an optical transmission system according to the embodiment. As depicted in FIG. 1, an optical transmission system 10 includes an optical transmitter 100 and an optical receiver 200. The optical transmitter 100 transmits optical signals through an optical transmission path 11 to the optical receiver 200. With reference to FIG. 1, configuration of the optical transmitter 100 will be described, while configuration of the optical receiver 200 will be described hereinafter (for example, with reference to FIGS. 2, and 9 to 20).

The optical transmitter 100 includes an LD 110a (first light source), an optical branching unit 121a, a wavelength locker 122a, a polarization adjusting unit 130a, a phase modulator 140a (first phase modulator), a driving unit 151a, a driving unit 152a, an LD 110b (second light source), an optical branching unit 121b, a wavelength locker 122b, a polarization adjusting unit 130b, a phase modulator 140b (second phase modulator), a driving unit 151b, a driving unit 152b, and a polarized beam combiner (PBC) 160.

The LD 110a, the optical branching unit 121a, the wavelength locker 122a, the polarization adjusting unit 130a, the phase modulator 140a, the driving unit 151a, and the driving unit 152a generate light of a polarization X. LD 110b, the optical branching unit 121b, the wavelength locker 122b, the polarization adjusting unit 130b, the phase modulator 140b, the driving unit 151b, and the driving unit 152b generate light of a polarization Y. Here, the polarization X and the polarization Y are orthogonal to one another.

The LD 110a generates and outputs light to the optical branching unit 121a. The LD 110a also changes the wavelength of the light generated, under the control of the wavelength locker 122a. The optical branching unit 121a branches the light output from the LD 110a and outputs the branched light to the wavelength locker 122a and the polarization adjusting unit 130a. The wavelength locker 122a (WL) monitors the wavelength of the light output from the optical branching unit 121a and controls the LD 110a to keep the monitored wavelength constant.

The polarization adjusting unit 130a (polarization controller (PC)) adjusts the polarization of the light output from the optical branching unit 121a to the polarization X and outputs the adjusted light to the phase modulator 140a. The phase modulator 140a phase modulates the light output from the polarization adjusting unit 130a, based on modulation data output by the driving unit 151a and the driving unit 152a.

For example, the phase modulator 140a is implemented by a branching unit 141a, an I arm 142a, a Q arm 143a, an interferometer 144a, an interferometer 145a, a phase shifter 146a, and a combining unit 147a disposed on a lithium niobate (LN) substrate. The branching unit 141a branches the light output from the polarization adjusting unit 130a and outputs the branched light to the I arm 142a and the Q arm 143a.

The I arm 142a transmits the light output from the branching unit 141a. The interferometer 144a is disposed in the I arm 142a. The interferometer 144a branches and couples the light transmitted through the I arm 142a. The interferometer 144a also phase modulates one of the branches of light, based on the modulation data output by the driving unit 151a. The interferometer 144a outputs the coupled light to combining unit 147a.

The Q arm 143a transmits light output from the branching unit 141a. The interferometer 145a and the phase shifter 146a are disposed in the Q arm 143a. The interferometer 145a branches and couples the light transmitted through the Q arm 143a. The interferometer 145a also phase modulates one of the branches of light, based on the modulation data output by the driving unit 152a. The interferometer 145a outputs the coupled light to the phase shifter 146a.

The phase shifter 146a delays the light output from the interferometer 145a by π/2 and outputs the delayed light to the combining unit 147a. The combining unit 147a combines the light output from the I arm 142a and the light output from the Q arm 143a and outputs the combined light to the polarized beam combiner 160. The light output from the phase modulator 140a to the polarized beam combiner 160 is an optical signal of the polarization X (QPSK modulation).

The driving unit 151a outputs to the interferometer 144a, modulation data for an I channel of the polarization X. The driving unit 152a outputs to the interferometer 144a, modulation data for a Q channel of the polarization X. Here, modulation data is single-ended input to the driving unit 151a and the driving unit 152a, respectively. The driving unit 151a outputs the single-ended modulation data to the interferometer 144a. The driving unit 152a outputs the single-ended modulation data to the interferometer 145a.

As configurations of the LD 110b, the optical branching unit 121b, the wavelength locker 122b, the polarization adjusting unit 130b, the phase modulator 140b, the driving unit 151b, and the driving unit 152b correspond respectively to the LD 110a, the optical branching unit 121a, the wavelength locker 122a, the polarization adjusting unit 130a, the phase modulator 140a, the driving unit 151a, and the driving unit 152a, description therefor is herein omitted, noting that the polarization adjusting unit 130b adjusts the light from the optical branching unit 121b to the polarization Y, and the light output from the phase modulator 140b is an optical signal of the polarization Y (QPSK modulation).

The polarized beam combiner 160 combines the optical signal (polarization X) output from the phase modulator 140a and the optical signal (polarization Y) output from the phase modulator 140b and outputs the combined optical signals (DP-QPSK). The optical signal output from the polarized beam combiner 160 is transmitted through the optical transmission path 11 to the optical receiver 200.

Here, configuration has been described such that forward propagated light of the LD 110a is branched by the optical branching unit 121a, where one of the branches is monitored by the wavelength locker 122a, however, backward propagated light of the LD 110a may be monitored by the wavelength locker 122a. Similarly, the backward propagated light of the LD 110b may be monitored by the wavelength locker 122b. In such cases, the optical branching unit 121a and the optical branching unit 121b may be omitted.

Figure 2:
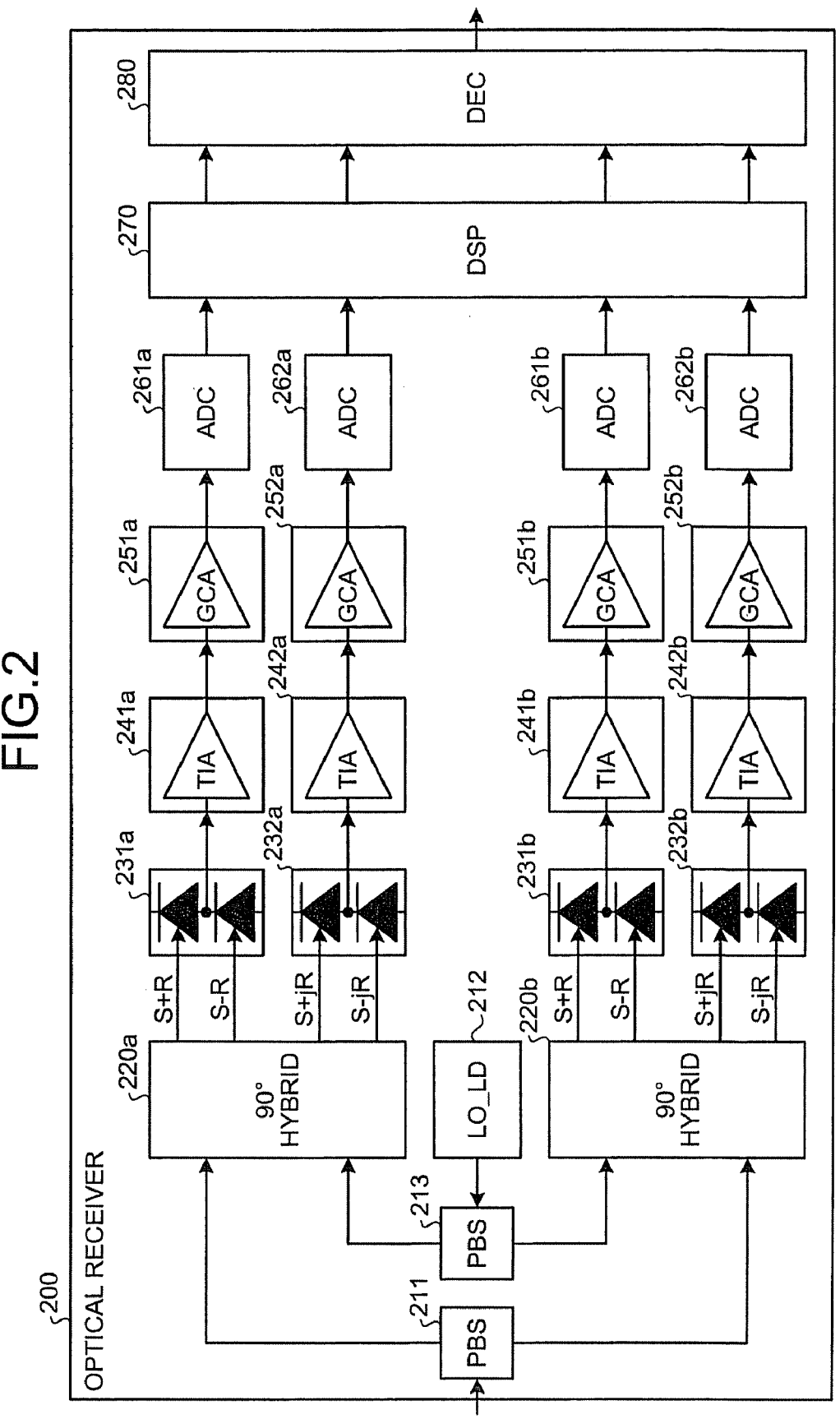
FIG. 2 is a block diagram of a first example of the optical receiver depicted in FIG. 1.

FIG. 2 is a block diagram of a first example of the optical receiver depicted in FIG. 1. As depicted in FIG. 2, the optical receiver 200 includes a first polarization beam splitter (PBS) 211, a local oscillator 212, a second PBS 213, optical hybrid circuits 220a and 220b, differential optical detectors 231a, 232a, 231b, and 232b, transimpedance amplifiers (TIAs)

241a, 242a, 241b and 242b, gain control amplifiers (GCAs) 251a, 252a, 251b and 252b, analog-digital converting units 261a, 262a, 261b and 262b, a digital signal processing unit 270, and an identifying unit 280.

The first PBS 211 receives the optical signal transmitted from the optical transmitter 100 (refer to FIG. 1) and splits the optical signal according to the polarization X and the polarization Y. The first PBS 211 outputs the optical signal of the polarization X to the optical hybrid circuit 220a and outputs the optical signal of the polarization Y to the optical hybrid circuit 220b.

The local oscillator 212 (LO_LD) generates light of a fixed frequency and outputs the generated light to the second PBS 213. The light output by the local oscillator 212 includes a component of the polarization X and a component of the polarization Y. The second PBS 213 splits the light output from the local oscillator 212, according to the polarization X and the polarization Y. The second PBS 213 outputs the optical signal of the polarization X to the optical hybrid circuit 220a and outputs the optical signal of the polarization Y to the optical hybrid circuit 220b.

The optical hybrid circuit 220a, the differential optical detectors 231a and 232a, the TIAs 241a and 242a, the GCAs 251a and 252a, the analog-digital converting units 261a and 262a, the digital signal processing unit 270 and the identifying unit 280 configure a first digital coherent receiver that is of an intradyne configuration and corresponds to the phase modulator 140a.

Further, the optical hybrid circuit 220a, the differential optical detectors 231a and 232a, the TIAs 241a and 242a, and the GCAs 251a and 252a configure a frontend of the polarization X, outputting an electrical signal of a real part and an imaginary part of the optical signal of the polarization X. For example, the frontend of the polarization X, by a mixing of the light of the polarization X from the local oscillator 212 and the optical signal of the polarization X from the first PBS 211, outputs an electrical signal of a real part and an imaginary part.

The optical hybrid circuit 220a (90° HYBRID) combines the optical signal from the first PBS 211 and the light from the second PBS 213 to generate 2 pairs of light differing in phase by 90°. For example, the optical hybrid circuit 220a outputs 0°-phase light (S+R) and 180°-phase light (S−R) to the differential optical detector 231a. Further, the optical hybrid circuit 220a outputs 90°-phase light (S+jR) and 270°-phase light (S−jR) to the differential optical detector 232a.

The differential optical detector 231a receives the light (S+R) and the light (S−R) output from the optical hybrid circuit 220a, detects the difference in power between the lights (S+R) and (S−R) for opto-electro conversion, and outputs the electrical signal obtained thereby to the TIA 241a. The differential optical detector 232a receives the light (S+jR) and the light (S−jR) output from the optical hybrid circuit 220a, detects the difference in power between the lights (S+jR) and (S−jR) for opto-electro conversion, and outputs the electrical signal obtained hereby to the TIA 242a.

The TIA 241a amplifies the electrical signal output from the differential optical detector 231a and outputs the amplified electrical signal to the GCA 251a. The TIA 242a amplifies the electrical signal output from the differential optical detector 232a and outputs the amplified electrical signal to the GCA 252a.

The GCA 251a stabilizes the amplitude of the electrical signal output from the TIA 241a and outputs the amplitude-controlled electrical signal to the analog-digital converting unit 261a. The GCA 252a stabilizes the amplitude of the electrical signal output from the TIA 242a and outputs the amplitude-controlled electrical signal to the analog-digital converting unit 262a.

The analog-digital converting unit 261a (analog/digital converter (ADC)) converts the analog electrical signal output from the GCA 251a into a digital signal and outputs the digital signal to the digital signal processing unit 270. The analog-digital converting unit 262a converts the analog electrical signal output from the GCA 252a and outputs the digital signal to the digital signal processing unit 270.

The digital signal processing unit 270 (digital signal processor (DSP)) performs phase estimation with respect to the digital signals (signal of the polarization X) output from the analog-digital converting units 261a and 262a, and extracts a signal. The digital signal processing unit 270 outputs the extracted signal to the identifying unit 280.

The optical hybrid circuit 220b, the differential optical detector 231b and 232b, the TIAs 241b and 242b, the GCAs 251b and 252b, the analog-digital converting units 261b and 262b, the digital signal processing unit 270 and the identifying unit 280 configure a second coherent receiver that corresponds to the phase modulator 140b.

Further, the optical hybrid circuit 220b, the differential optical detector 231b and 232b, the TIAs 241b and 242b, the GCAs 251b and 252b configure a frontend of the polarization Y, outputting an electrical signal of a real part and an imaginary part of the optical signal of the polarization Y. For example, the frontend of the polarization Y, by a mixing of the light of the polarization Y from the local oscillator 212 and the optical signal of the polarization X from the first PBS 211, outputs an electrical signal of a real part and an imaginary part.

Configurations of the optical hybrid circuit 220b, the differential optical detectors 231b and 232b, the TIAs 241b and 242b, the GCAs 251b and 252b, and the analog-digital converting units 261b and 262b respectively correspond to the configurations of the optical hybrid circuit 220a and 220b, the differential optical detectors 231a and 232a, the TIAs 241a and 242a, the GCAs 251a and 252a, and the analog-digital converting units 261a and 262a and thus, description therefor is omitted herein.

The digital signal processing unit 270 performs phase estimation with respect to the digital signals (signal of the polarization Y) output from the analog-digital converting units 261b and 262b, extracts a signal and outputs the extracted signal to the identifying unit 280. Further, the digital signal processing unit 270 may perform, in addition to phase estimation, other various types of digital processing such as dispersion compensation. The identifying unit 280 (DEC) identifies the signal output from the digital signal processing unit 270 and outputs an identification result.

Figure 3:
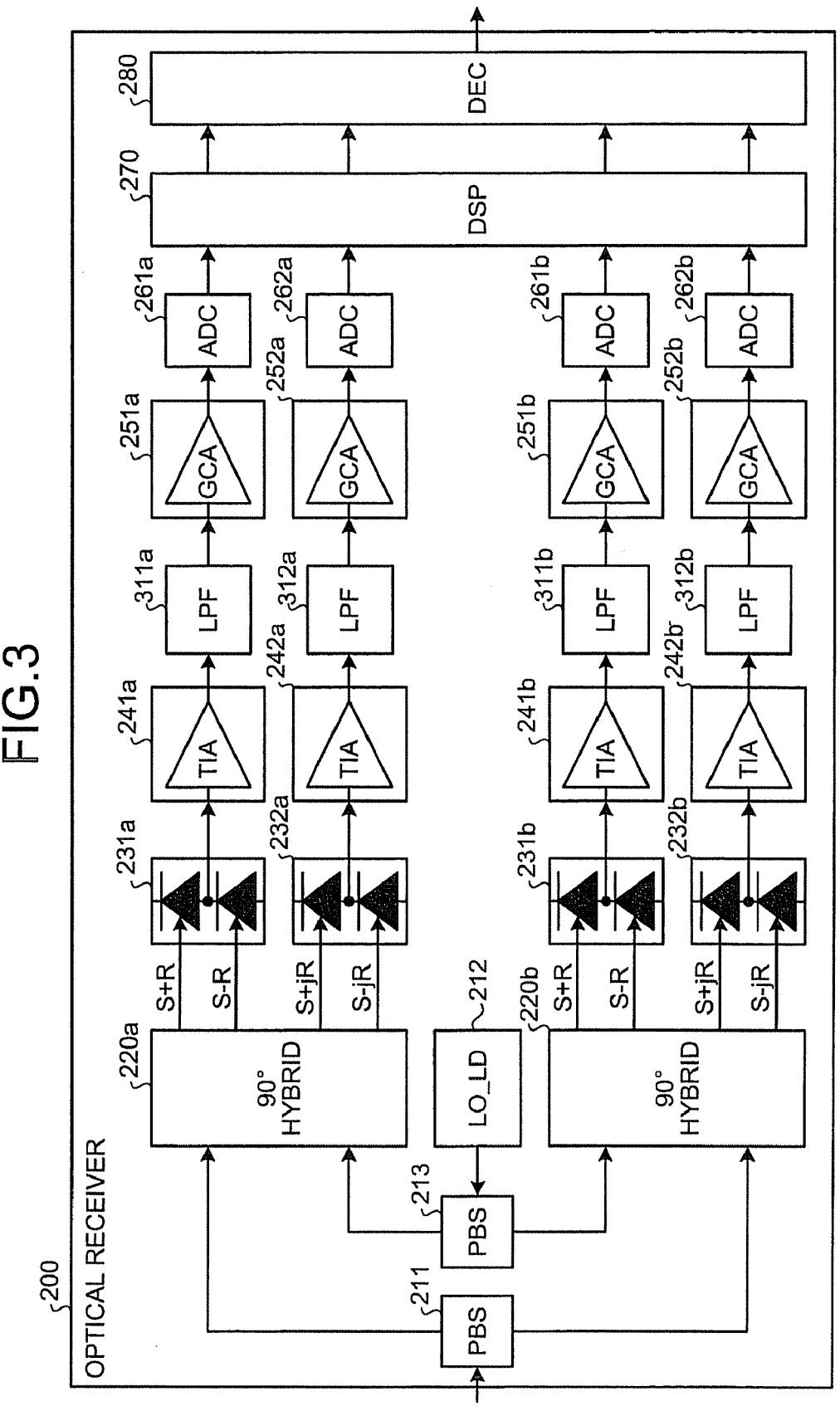
FIG. 3 is a block diagram of a second example of the optical receiver.

FIG. 3 is a block diagram of a second example of the optical receiver. In FIG. 3, components identical to those depicted in FIG. 2 are given the same reference characters used in FIG. 2 and description therefor is omitted herein. As depicted in FIG. 3, the optical receiver 200 may have in addition to the configuration depicted in FIG. 2, low pass filters (LPFs) 311a, 312a, 311b, and 312b.

The LPF 311a removes a high frequency component from the electrical signal output from the TIA 241a to the LPF 311a. Similarly, the LPFs 312a, 311b, and 312b respectively extract high frequency components from the electrical signals respectively output from the TIAs 242a, 241b, and 242b to the LPFs 312a, 311b, and 312b. Thus, precision of the digital conversion at the analog-digital converting units 261a, 262a, 261b, and 262b can be improved.

Figure 4:
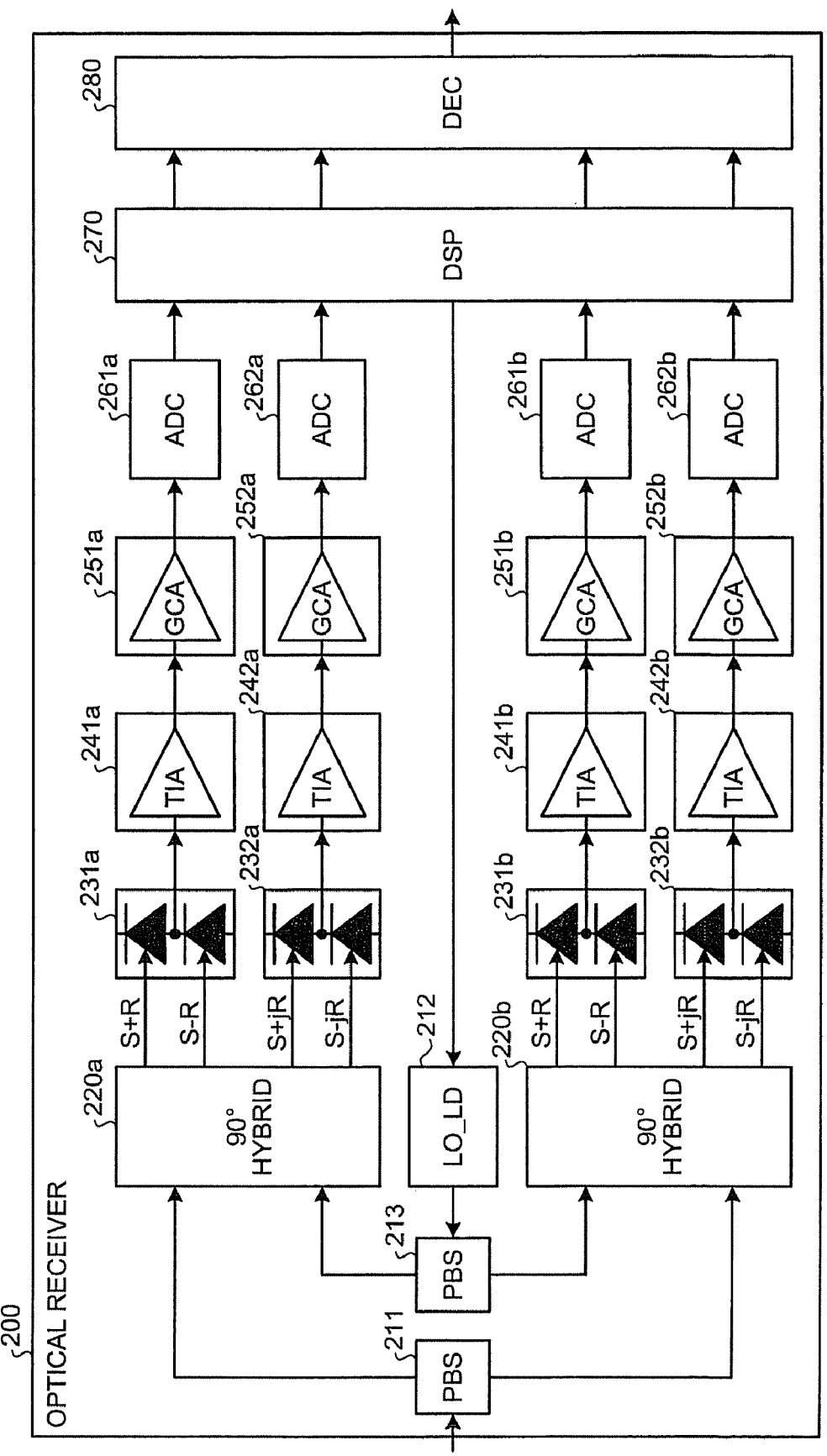
FIG. 4 is a block diagram of a third example of the optical receiver.

FIG. 4 is a block diagram of a third example of the optical receiver. In FIG. 4, components identical to those depicted in FIG. 2 are given the same reference characters used in FIG. 2 and description therefor is omitted herein. As depicted in FIG. 4, the configuration depicted in FIG. 2 may be adapted such that the local oscillator 212, under the control of the digital signal processing unit 270, varies the frequency of the light output.

The digital signal processing unit 270, based on the result of digital processing with respect to the digital signals output from the analog-digital converting units 261a, 262a, 261b, and 262b, controls the frequency of the light output by the local oscillator 212. Thus, the frequency of the light output by the local oscillator 212 and the frequency of the optical signal can be made equivalent with high precision to enhance sensitivity in receiving the optical signal.

Figure 5:
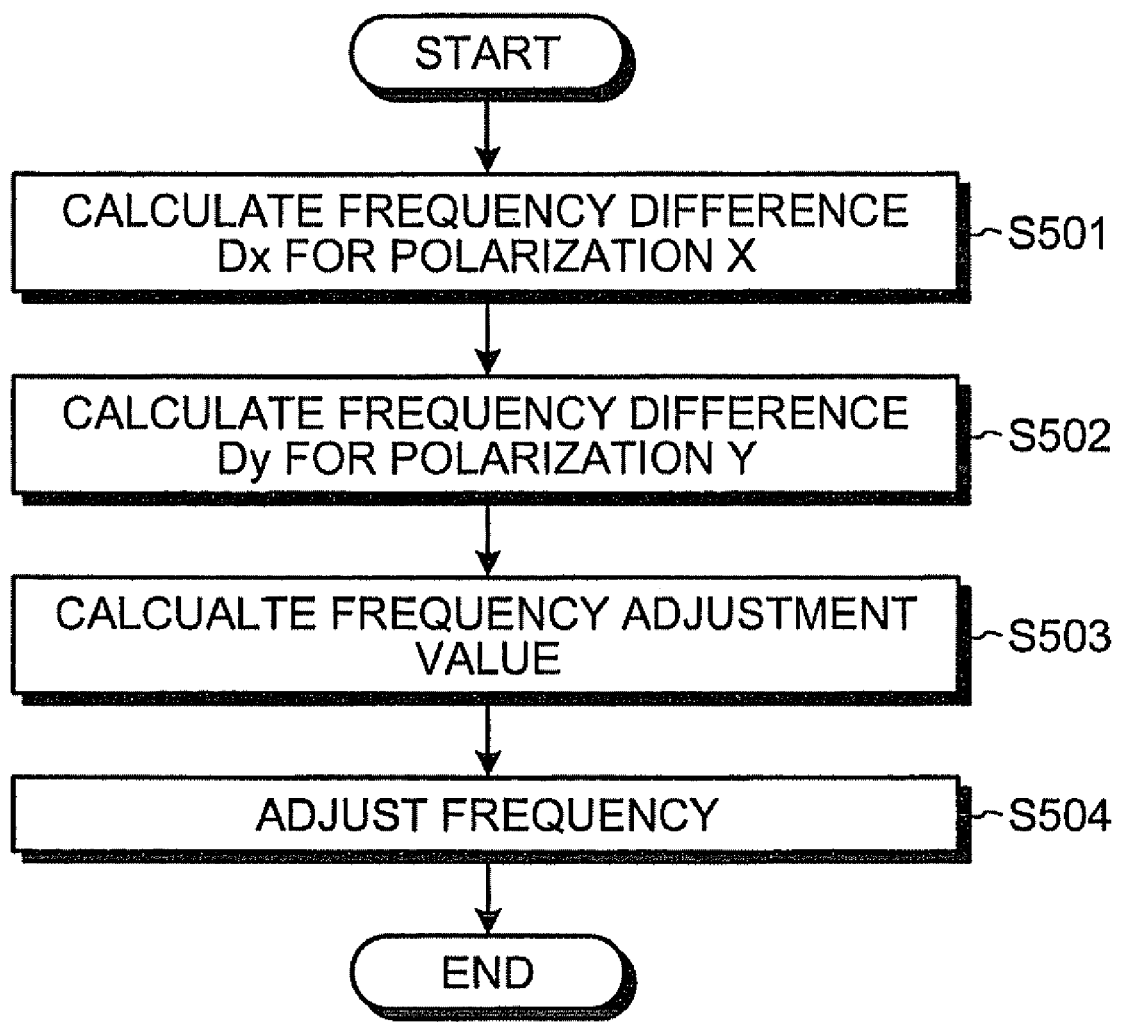
FIG. 5 is a flowchart of one example of frequency control at a digital signal processing unit depicted in FIG. 4.

FIG. 5 is a flowchart of one example of frequency control at the digital signal processing unit depicted in FIG. 4. The digital signal processing unit 270, according to, for example, the following operations, controls the frequency of the light output by the local oscillator 212. Based on the digital signals output from the analog-digital converting units 261a and 262a, the digital signal processing unit 270 calculates the frequency difference Dx (frequency difference for the polarization X) between the frequency of the optical signal of the polarization X and the frequency of the light output by the local oscillator 212 (step S501).

Next, based on the digital signals output from the analog-digital converting units 261b and 262b, the digital signal processing unit 270 calculates the frequency difference Dy (difference for the polarization Y) between the frequency of the optical signal of the polarization Y and the frequency of the light output by the local oscillator 212 (step S502). The digital signal processing unit 270 further calculates a frequency adjustment value based on the frequency difference Dx calculated at step S501 and the frequency difference Dy calculated at step S502 (step S503).

According to the frequency adjustment value calculated at step S503, the digital signal processing unit 270 adjusts the frequency of the light output by the local oscillator 212 (step S504), ending series of operations. By repeating these operations, the digital signal processing unit 270 is able to control the frequency of the light output by the local oscillator 212. At step S503, for example, the average of the frequency difference Dx and the frequency difference Dy (Dx+Dy)/2 may be calculated as the frequency adjustment value.

In this example, although the digital signal processing unit 270 is described to calculate the frequency difference Dx and the frequency difference Dy, the frequency control performed at the digital signal processing unit 270 is not limited hereto and may be by another method. For example, the digital signal processing unit 270 may measure the quality Qx of the digital signals output from the analog-digital converting units 2G1a and 262a and the quality Qy of the digital signal output from the analog-digital converting unit 261b and 2G2b, where the quality Qx and the quality Qy are, for example, bit error rate (BER).

The digital signal processing unit 270 calculates the frequency adjustment value such that the sum of the quality Qx and the quality Qy becomes large. Thus, the optical signal of the polarization X and the optical signal of the polarization Y can be received at maximum quality. Alternatively, the digital signal processing unit 270 may calculate the frequency adjustment value such that the difference between the quality Qx and the quality Qy becomes small. Thus, the optical signal of the polarization X and the optical signal of the polarization Y can be received at equivalent qualities.

Figure 6:
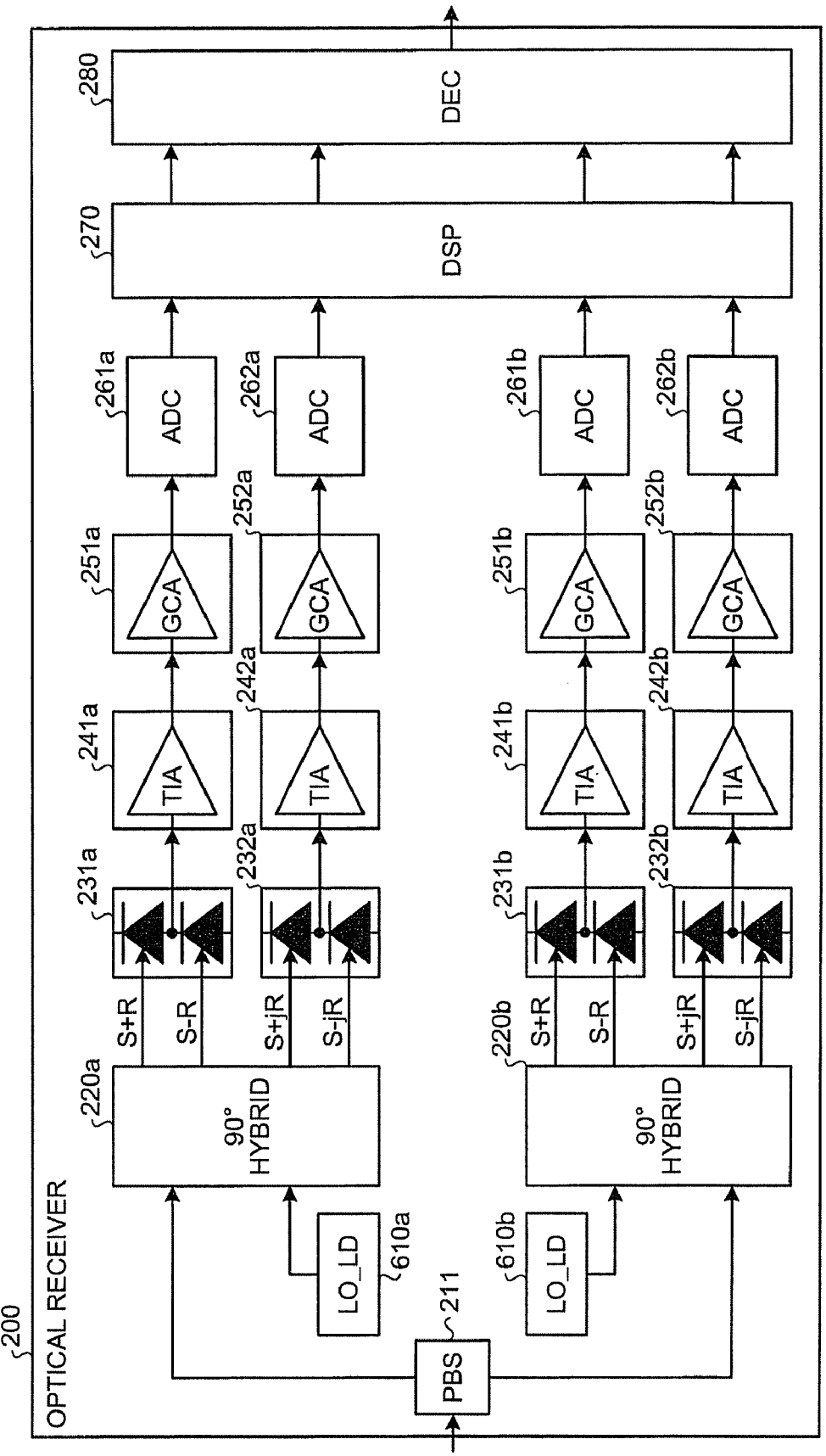
FIG. 6 is a block diagram of a fourth example of the optical receiver.

FIG. 6 is a block diagram of a fourth example of the optical receiver. In FIG. 6, components identical to those depicted in FIG. 2 are given the same reference characters used in FIG. 2 and description therefor is omitted herein. As depicted in FIG. 6, the local oscillator 212 and the second PBS 213 in the configuration depicted in FIG. 2 may be replaced with a local oscillator 610a and a local oscillator 610b.

The local oscillator 610a generates light of the polarization X and outputs the generated light to the optical hybrid circuit 220a. The local oscillator 610b generates light of the polarization Y and outputs the generated light to the optical hybrid circuit 220b. Thus, light of sufficient power can be supplied to the optical hybrid circuit 220a and the optical hybrid circuit 220b, respectively.

Figure 7:
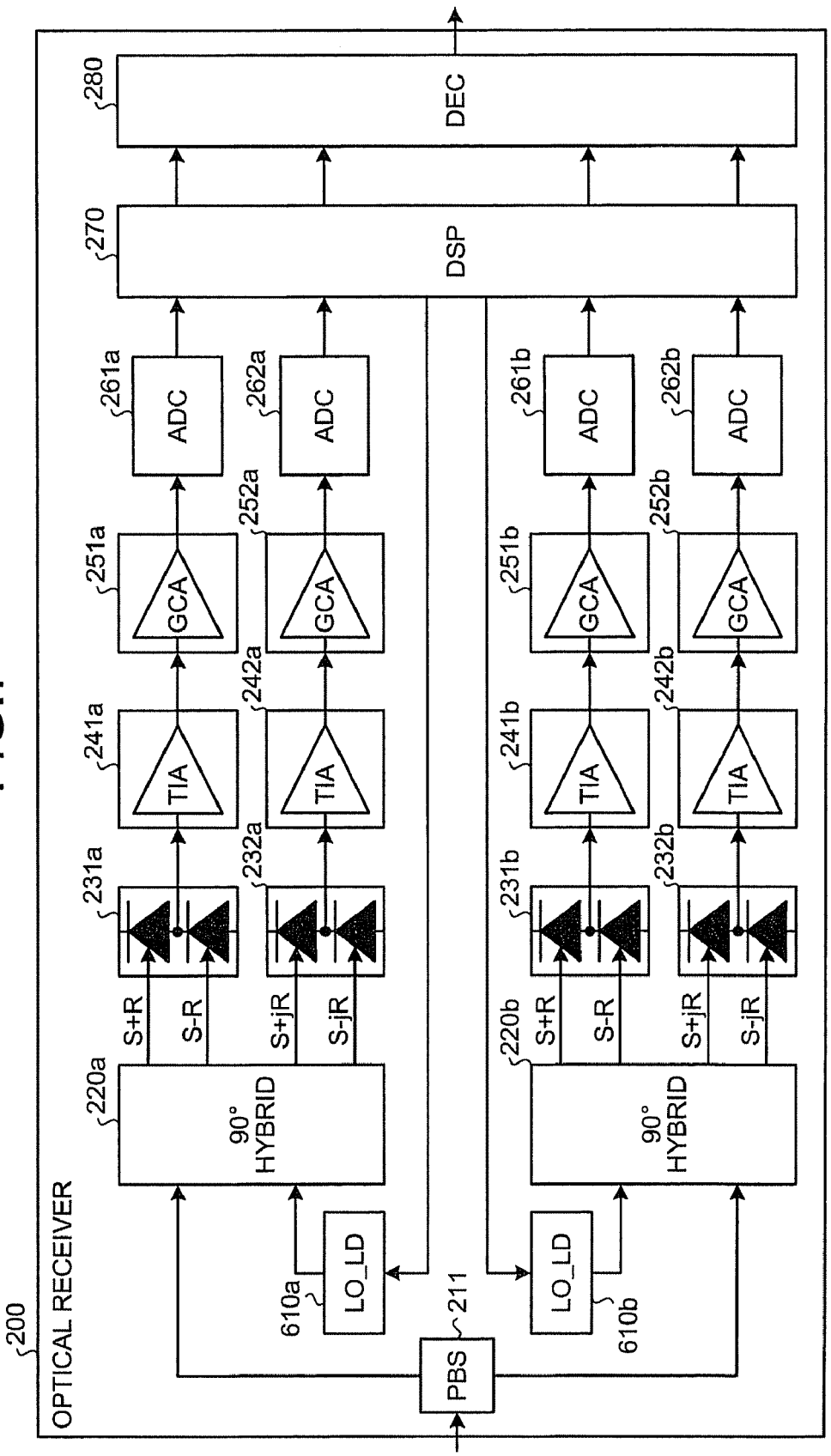
FIG. 7 is a block diagram of a fifth example of the optical receiver.

FIG. 7 is a block diagram of a fifth example of the optical receiver. In FIG. 7, components identical to those depicted in FIG. 6 are given the same reference characters used in FIG. 6 and description therefor is omitted herein. As depicted in FIG. 7, the configuration depicted in FIG. 6 may be adapted such that the local oscillator 610a and the local oscillator 610b, under the control of the digital signal processing unit 270, vary the frequency of the light output.

The digital signal processing unit 270, based on the result of digital processing with respect to the digital signals output from the analog-digital converting units 261a and 262a, controls the frequency of the light output by the local oscillator 610a. For example, the digital signal processing unit 270, based on the digital signal output from the analog-digital converting units 261a and 262a, calculates the frequency difference Dx between the frequency of the optical signal of the polarization X and the frequency of the light output from the local oscillator 610a. The digital signal processing unit 270 further controls the local oscillator 610a such that the frequency difference Dx becomes small.

Additionally, the digital signal processing unit 270, based on the digital signals output from the analog-digital converting units 261b and 262b, calculates the frequency difference Dy between the frequency of the optical signal of the polarization Y and the frequency of the light output from the local oscillator 610b. The digital signal processing unit 270 further controls the local oscillator 610b such that the frequency difference Dy become small. Thus, light of an optimal wavelength can be supplied to the local oscillator 610a and the local oscillator 610b, respectively. Consequently, the frequencies of the light output by the local oscillator 610a and the local oscillator 610b can be made identical to the frequencies of the polarizations of the optical signal with high precision to enhance sensitivity in receiving the optical signal.

Figure 8:
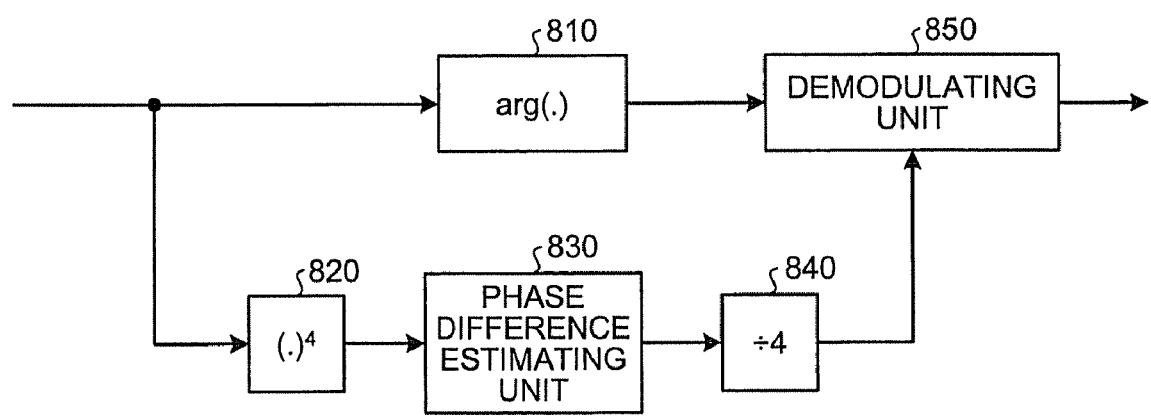
FIG. 8 is a functional diagram of phase difference estimation at the digital signal processing unit.

FIG. 8 is a functional diagram of phase difference estimation at the digital signal processing unit. The digital signal processing unit 270 depicted in FIGS. 2 to 7 includes an argument calculating unit 810, a multiplying unit 820, a phase difference estimating unit 830, an averaging unit 840, and a demodulating unit 850.

Herein, description is given for phase difference estimation with respect to an optical signal of the polarization X in an optical signal received by the optical receiver 200, noting that phase difference estimation for an optical signal of the polarization Y is the same.

The digital signals output from the analog-digital converting unit 261a and the analog-digital converting unit 262a are input to the argument calculating unit 810 and the multiplying unit 820, respectively. The argument calculating unit 810 calculates an argument component of the input digital signal and outputs the argument component to the demodulating unit 850. The multiplying unit 820 multiples by 4, the electric field represented by the input digital signal and outputs the product to the phase difference estimating unit 830.

The phase difference estimating unit 830, based on the product output from the multiplying unit 820, estimates the phase difference between the optical signal output from the first PBS 211 and the light output from the second PBS 213. The phase difference estimating unit 830 outputs the estimated phase difference to the averaging unit 840. The averaging unit 840 averages the phase difference output from the phase difference estimating unit 830 by dividing the phase difference by 4 and outputs the averaged phase difference to the demodulating unit 850.

The demodulating unit 850, based on the argument component output from the argument calculating unit 810 and the phase difference output from the averaging unit 840, performs digital signal demodulation. The values for the multiplication at the multiplying unit 820 and for the division at the averaging unit 840 are determined by the modulation scheme of the optical light received by the optical receiver 200. Here, since the modulation scheme of the optical signal received by the optical receiver 200 is QPSK, the electric field is multiplied by 4 at the multiplying unit 820 and the phase difference is divided by 4 at the averaging unit 840.

Figure 9:
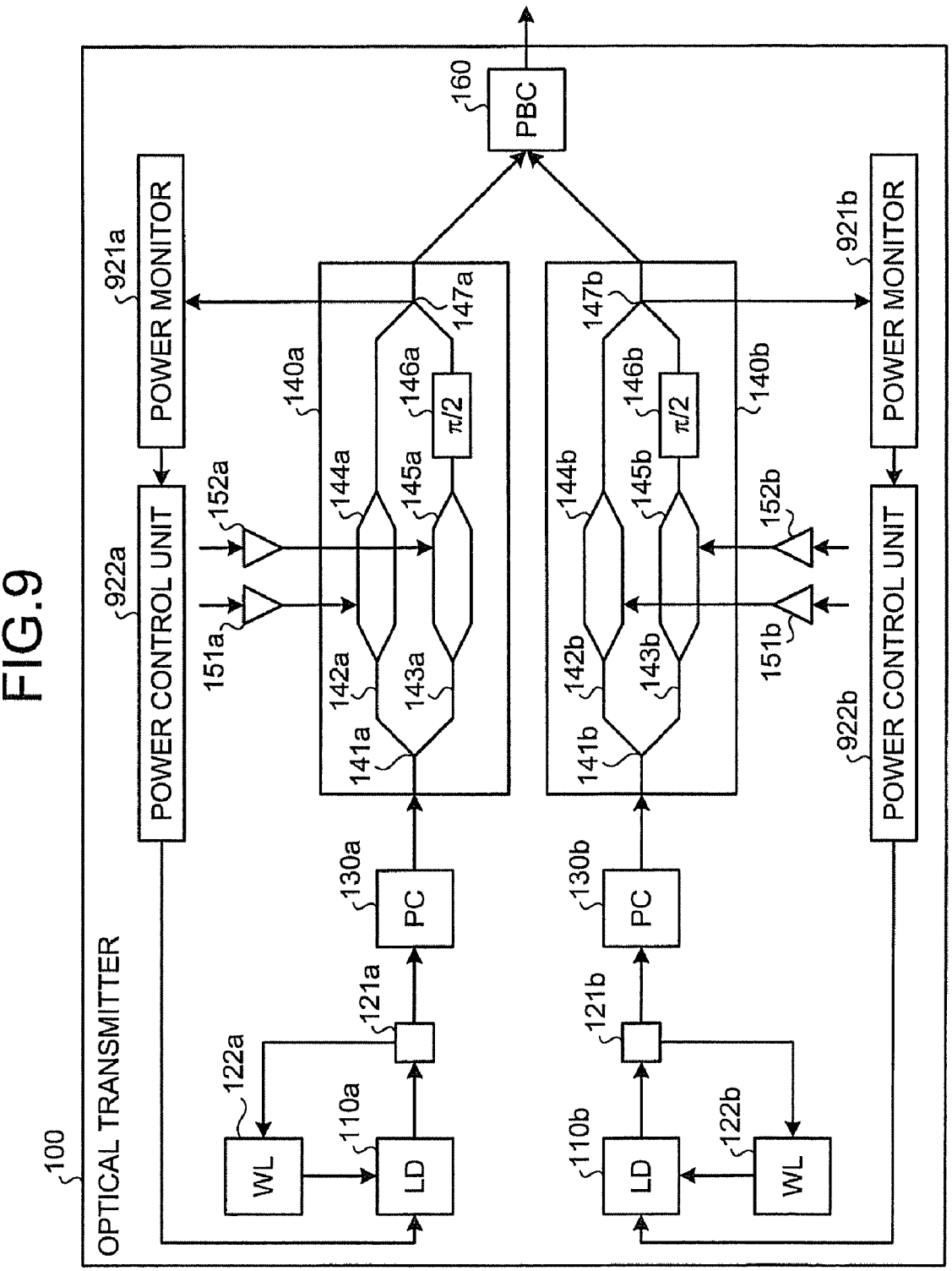
FIG. 9 is a block diagram of a first example of another configuration of the optical transmitter depicted in FIG. 1.

FIG. 9 is a block diagram of a first example of another configuration of the optical transmitter depicted in FIG. 1. In FIG. 9 components identical to those depicted in FIG. 1 are given the same reference characters used in FIG. 1 and description therefor is omitted herein. As depicted in FIG. 9, the optical transmitter 100 may include in addition to the configuration depicted in FIG. 1, power monitors 921a and 921b, and power control units (power controllers) 922a and 922b.

The LD 110a, under the control of the power control unit 922a, varies the power of the light output. The power monitor 921a monitors the power of the optical signal output from the combining unit 147a and outputs the monitored power to the power control unit 922a. The power control unit 922a controls the LD 110a such that the power indicated by the power monitor 921a becomes stable.

The LD 110b, under the control of the power control unit 922b, varies the power of the light output. The power monitor 921b monitors the power of the optical signal output from the combining unit 147b and outputs the monitored power to the power control unit 922b. The power control unit 922b controls LD 110b such that power indicated by the power monitor 921b becomes constant.

Thus, the power of the optical signal of the polarization X generated by the phase modulator 140a and the power of the optical signal of the polarization Y generated by the phase modulator 140b are monitored, and the LD 110a and the LD 110b are controlled respectively such that the respectively monitored powers becomes constant. Thus, the power of the optical signal (DP-QPSK) transmitted from the optical transmitter 100 can be stabilized. Further, the power of each polarization included in the optical signal output from the optical transmitter 100 can be made equivalent.

Figure 10:
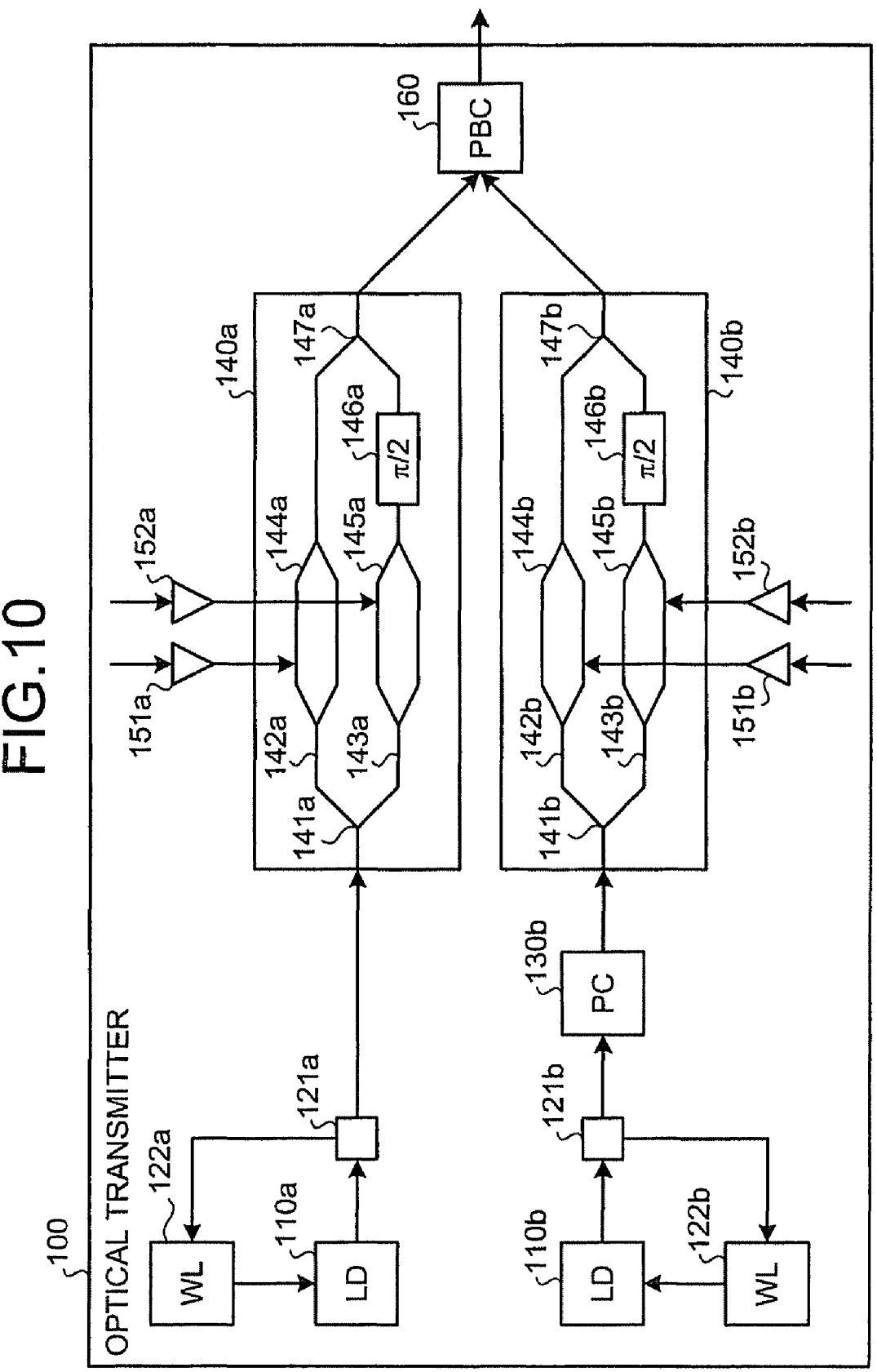
FIG. 10 is a block diagram of a second example of another configuration of the optical transmitter depicted in FIG. 1.

FIG. 10 is a block diagram of a second example of another configuration of the optical transmitter depicted in FIG. 1. In FIG. 10 components identical to those depicted in FIG. 1 are given the same reference characters used in FIG. 1 and description therefor is omitted herein. As depicted in FIG. 10, the polarization adjusting unit 130a may be omitted from the configuration depicted in FIG. 1. In this case, the LD 110a outputs the light of polarization X.

Similarly, although not depicted, the polarization adjusting unit 130b may be omitted from the configuration depicted in FIG. 1. In this case, the LD 110b outputs the light of the polarization Y. Thus, a configuration to combine the polarized optical signals respectively generated by the phase modulator 140a and the phase modulator 140b is not limited to the configuration depicted in FIG. 1.

Figure 11:
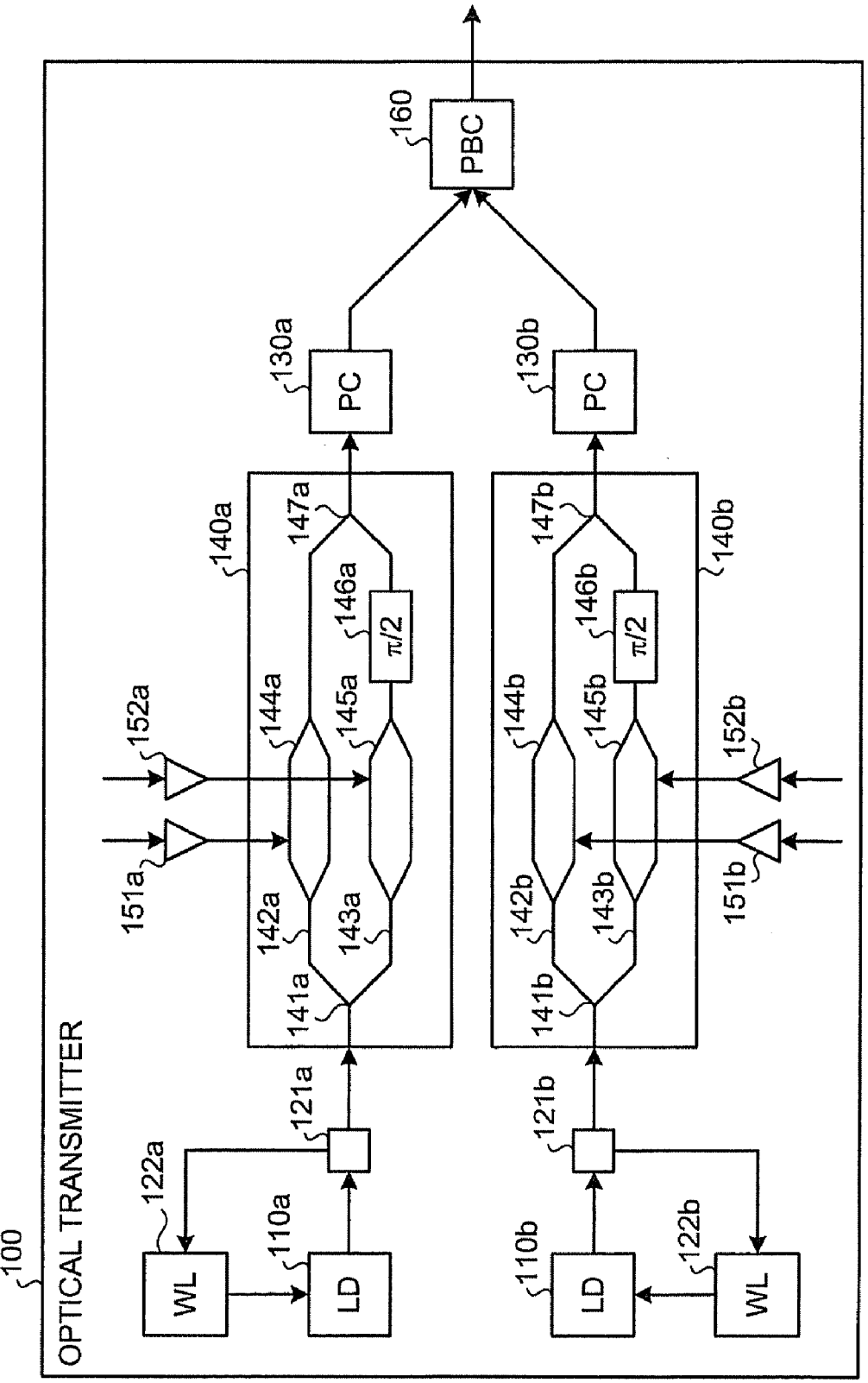
FIG. 11 is a block diagram of a third example of another configuration of the optical transmitter depicted in FIG. 1.

FIG. 11 is a block diagram of a third example of another configuration of the optical transmitter depicted in FIG. 1. In FIG. 11 components identical to those depicted in FIG. 1 are given the same reference characters used in FIG. 1 and description therefor is omitted herein. As depicted in FIG. 11, the polarization adjusting unit 130a and the polarization adjusting unit 130a may be disposed downstream from the phase modulator 140a and the phase modulator 140b, respectively. Thus, a configuration to combine the polarized optical signals respectively generated by the phase modulator 140a and the phase modulator 140b is not limited to the configuration depicted in FIG. 1.

Figure 12:
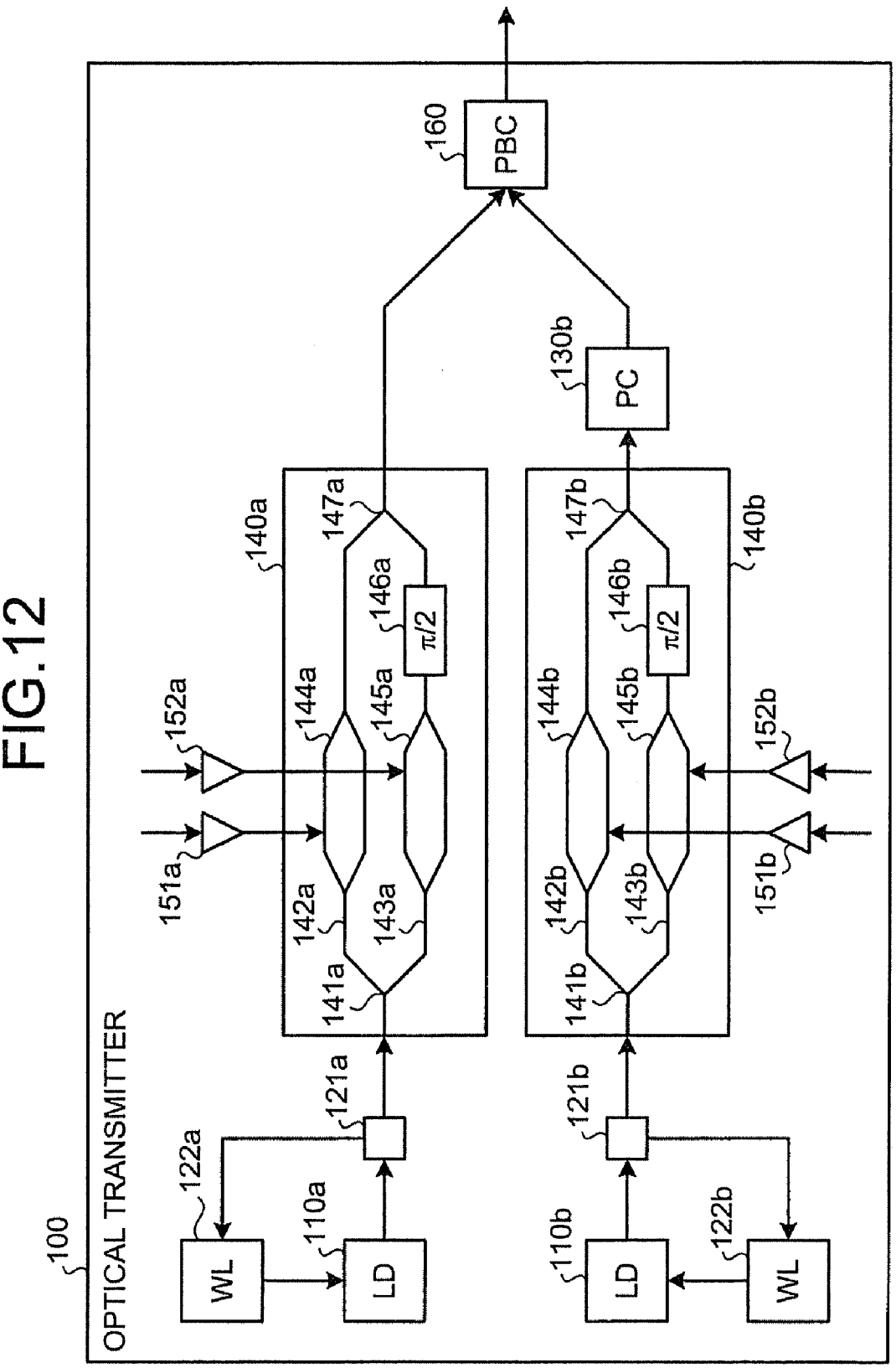
FIG. 12 is a block diagram of a fourth example of another configuration of the optical transmitter depicted in FIG. 1.

FIG. 12 is a block diagram of a fourth example of another configuration of the optical transmitter depicted in FIG. 1. In FIG. 12 components identical to those depicted in FIG. 11 are given the same reference characters used in FIG. 11 and description therefor is omitted herein. As depicted in FIG. 12, the polarization adjusting unit 130a may be omitted from the configuration depicted in FIG. 11. In this case, the LD 110a outputs the light of polarization X.

Similarly, although not depicted, the polarization adjusting unit 130b may be omitted from the configuration depicted in FIG. 11. In this case, the LD 110b outputs the light of the polarization Y. Thus, a configuration to combine the polarized optical signals respectively generated by the phase modulator 140a and the phase modulator 140b is not limited to the configuration depicted in FIG. 1.

Figure 13:
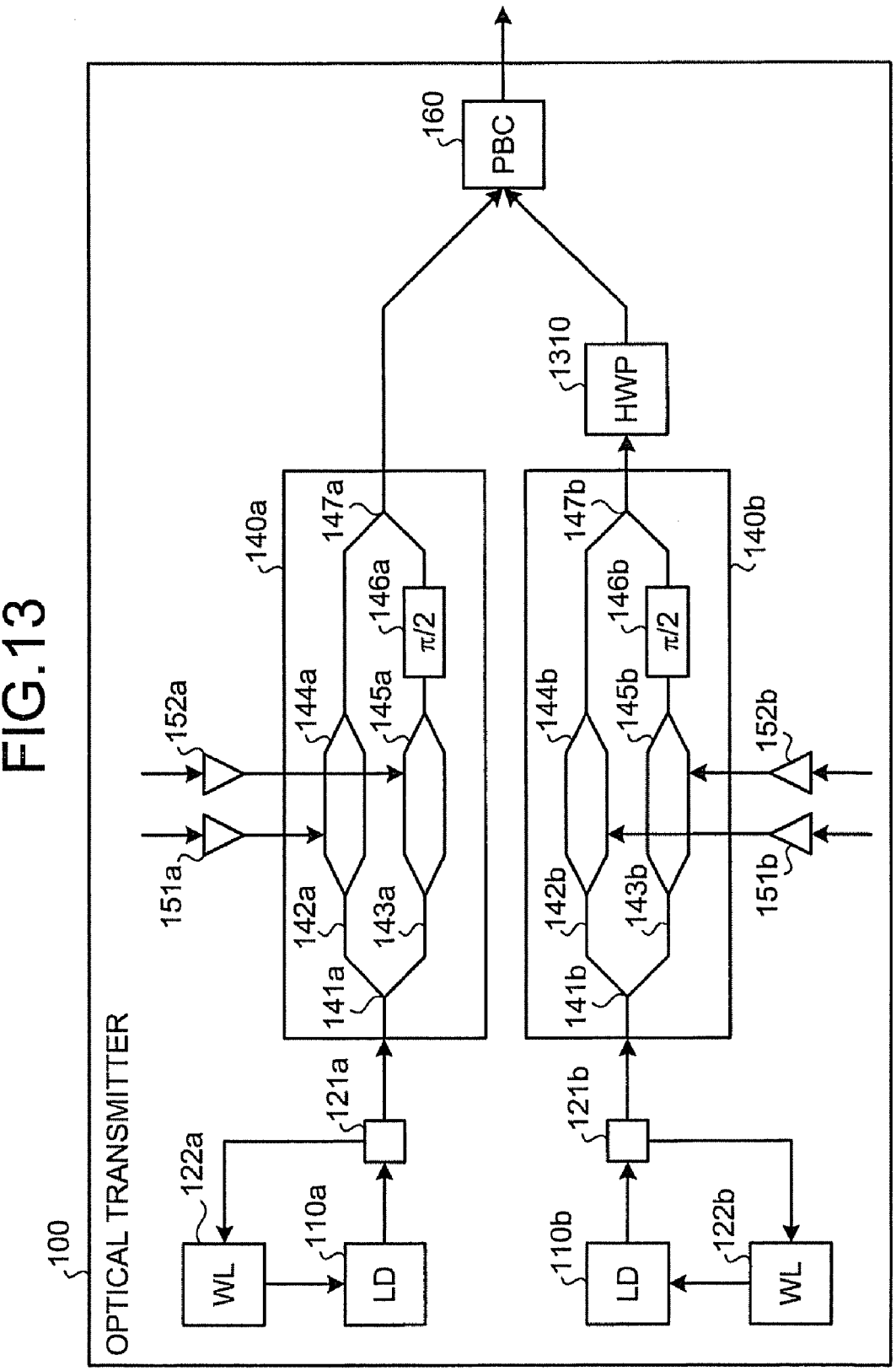
FIG. 13 is a block diagram of a fifth example of another configuration of the optical transmitter depicted in FIG. 1.

FIG. 13 is a block diagram of a fifth example of another configuration of the optical transmitter depicted in FIG. 1. In FIG. 13 components identical to those depicted in FIG. 12 are given the same reference characters used in FIG. 12 and description therefor is omitted herein. As depicted in FIG. 13, the polarization adjusting unit 130a in the configuration depicted in FIG. 12 may be replaced with a half wave plate (HWP) 1310. The HWP 1310 shifts the optical signal output from the phase modulator 140b to the polarized beam combiner 160, to the polarization Y.

Although not depicted, an HWP that shifts the optical signal to the polarization X may be disposed between the phase modulator 140a and the polarized beam combiner 160. Further, the HWP 1310 may be disposed between the optical branching unit 121b and the phase modulator 140b. Furthermore, the configuration may be such that the HWP 1310 is disposed between the optical branching unit 121b and the phase modulator 140b, and an HWP that shifts light to the polarization X is disposed between the optical branching unit 121a and the phase modulator 140a.

Figure 14:
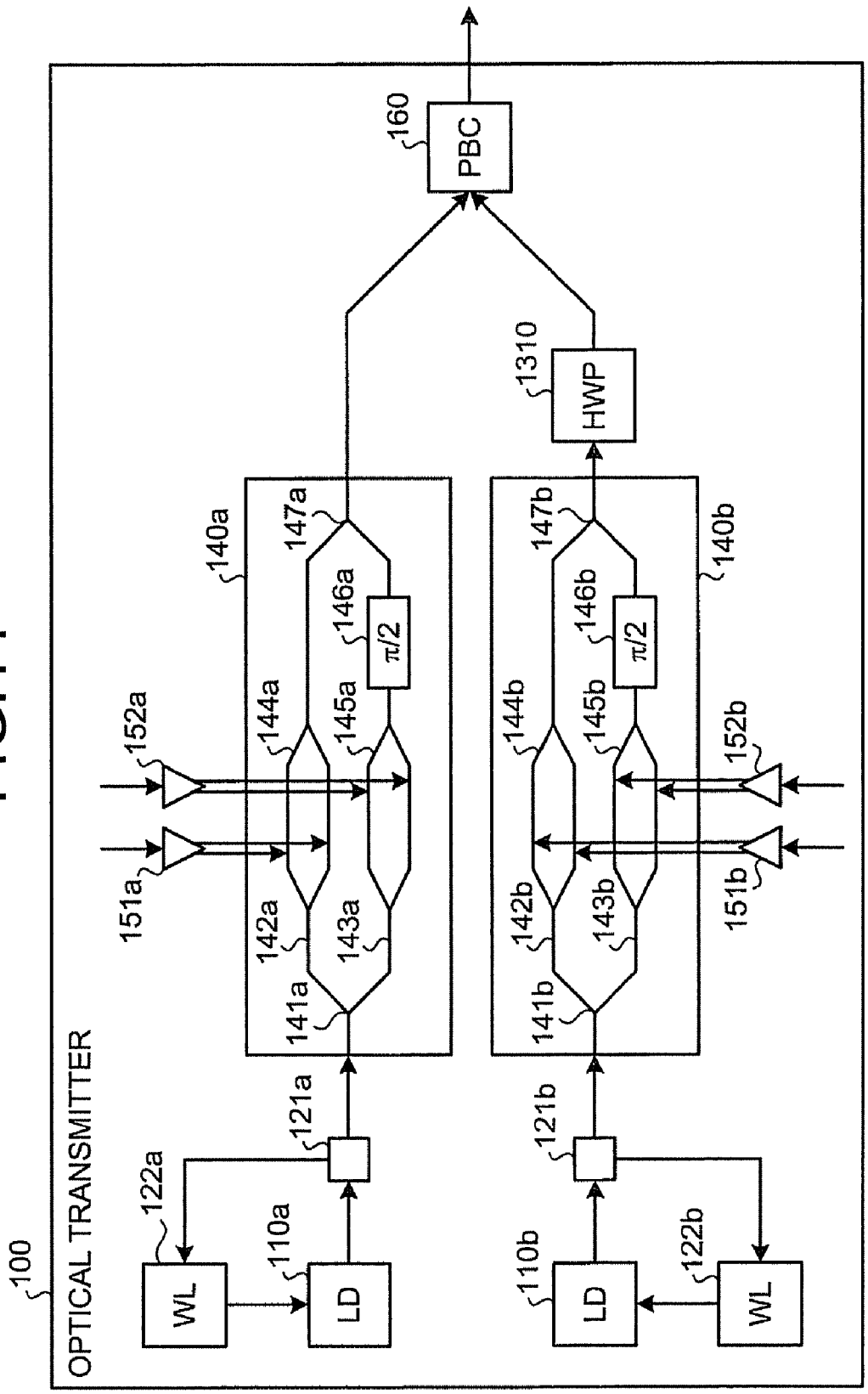
FIG. 14 is a block diagram of a sixth example of another configuration of the optical transmitter depicted in FIG. 1.

FIG. 14 is a block diagram of a sixth example of another configuration of the optical transmitter depicted in FIG. 1. In FIG. 14 components identical to those depicted in FIG. 13 are given the same reference characters used in FIG. 13 and description therefor is omitted herein. As depicted in FIG. 14, in the configuration depicted in FIG. 13, the driving unit 151a may output modulation data by a differential signal to the interferometer 144a. For example, the driving unit 151a may output the signals of a differential signal to each arm of the interferometer 144a, respectively. Similarly, the driving units 152a, 151b, and 152b may output modulation data by a differential signal to the interferometers 145a, 144b, and 145b.

The interferometer 144a, based on the differential signal output from the driving unit 151a, modulates the light transmitted through the I arm 142a. For example, the interferometer 144a phase modulates one of the branches of light based on one of the differential signals output from the driving unit 151*a* and phase modulates the other branch of light based on the other differential signal output from the driving unit 151*a*. Similarly, the interferometers 145*a*, 144*b*, and 145*b* modulate the light transmitted through the Q arm 143*a*, the I arm 142*b*, and the Q arm 143*b*, based on the differential signals output from the driving units 152*a*, 151*b*, and 152*b*. Thus, a configuration supplying modulation data is not limited to the configuration depicted in FIG. 1.

Figure 15:
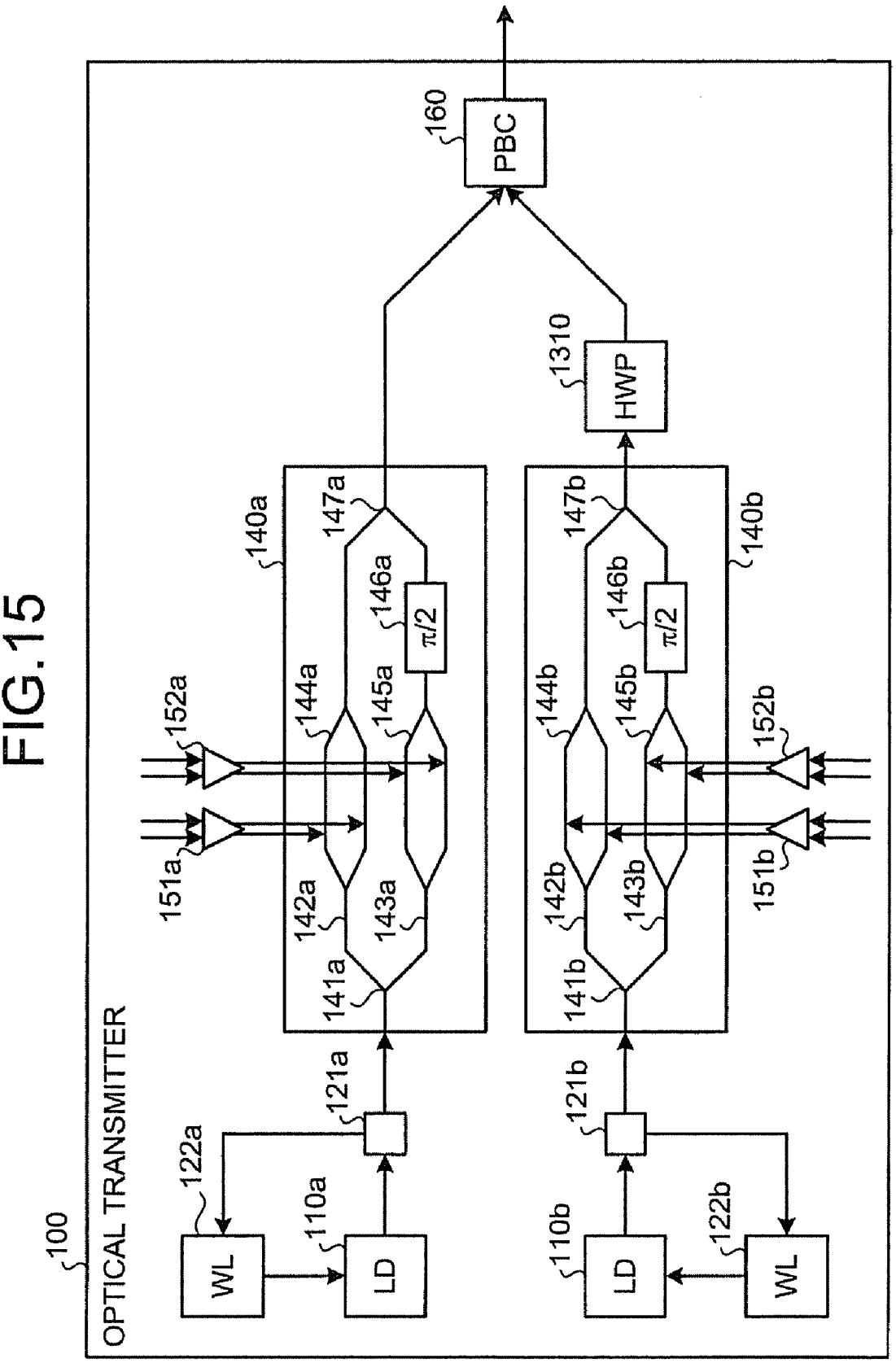
FIG. 15 is a block diagram of a seventh example of another configuration of the optical transmitter depicted in FIG. 1.

FIG. 15 is a block diagram of a seventh example of another configuration of the optical transmitter depicted in FIG. 1. In FIG. 15 components identical to those depicted in FIG. 14 are given the same reference characters used in FIG. 14 and description therefor is omitted herein. As depicted in FIG. 15, in the configuration depicted in FIG. 14, the driving units 151*a*, 152*a*, 151*b*, and 152*b* may receive modulation data by differential signals. Thus, a configuration supplying modulation data is not limited to the configuration depicted in FIG. 1.

Figure 16:
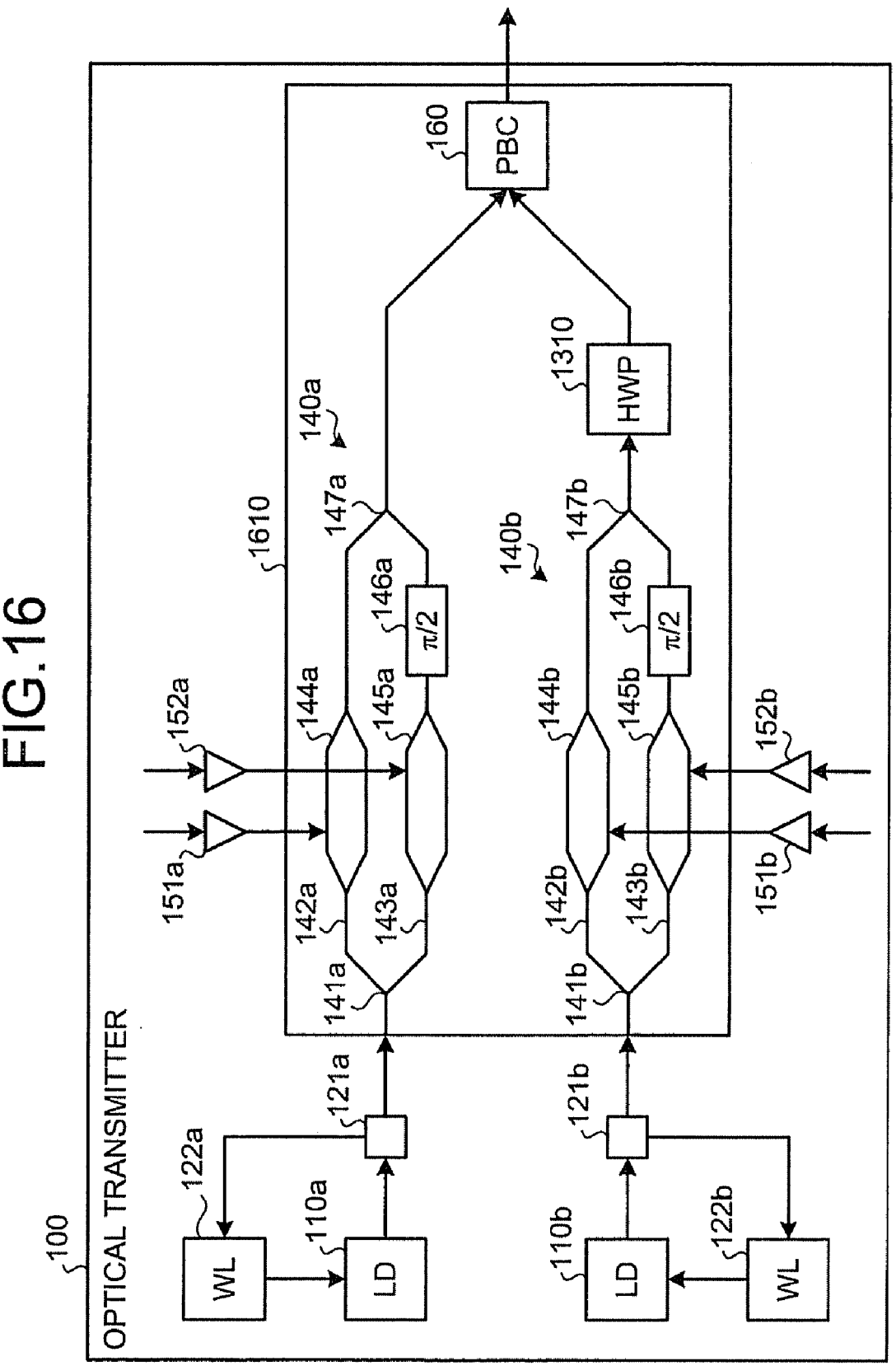
FIG. 16 is a block diagram of an eighth example of another configuration of the optical transmitter depicted in FIG. 1.

FIG. 16 is a block diagram of an eighth example of another configuration of the optical transmitter depicted in FIG. 1. In FIG. 16 components identical to those depicted in FIG. 13 are given the same reference characters used in FIG. 13 and description therefor is omitted herein. As depicted in FIG. 16, in the configuration depicted in FIG. 13, the phase modulator 140*a*, the phase modulator 140*b*, the HWP 1310, and the polarized beam combiner 160 may be implemented disposed on an LN substrate 1610. Thus, a configuration integrating the components of the optical transmitter 100 is not limited to the configuration depicted in FIG. 1.

Figure 17:
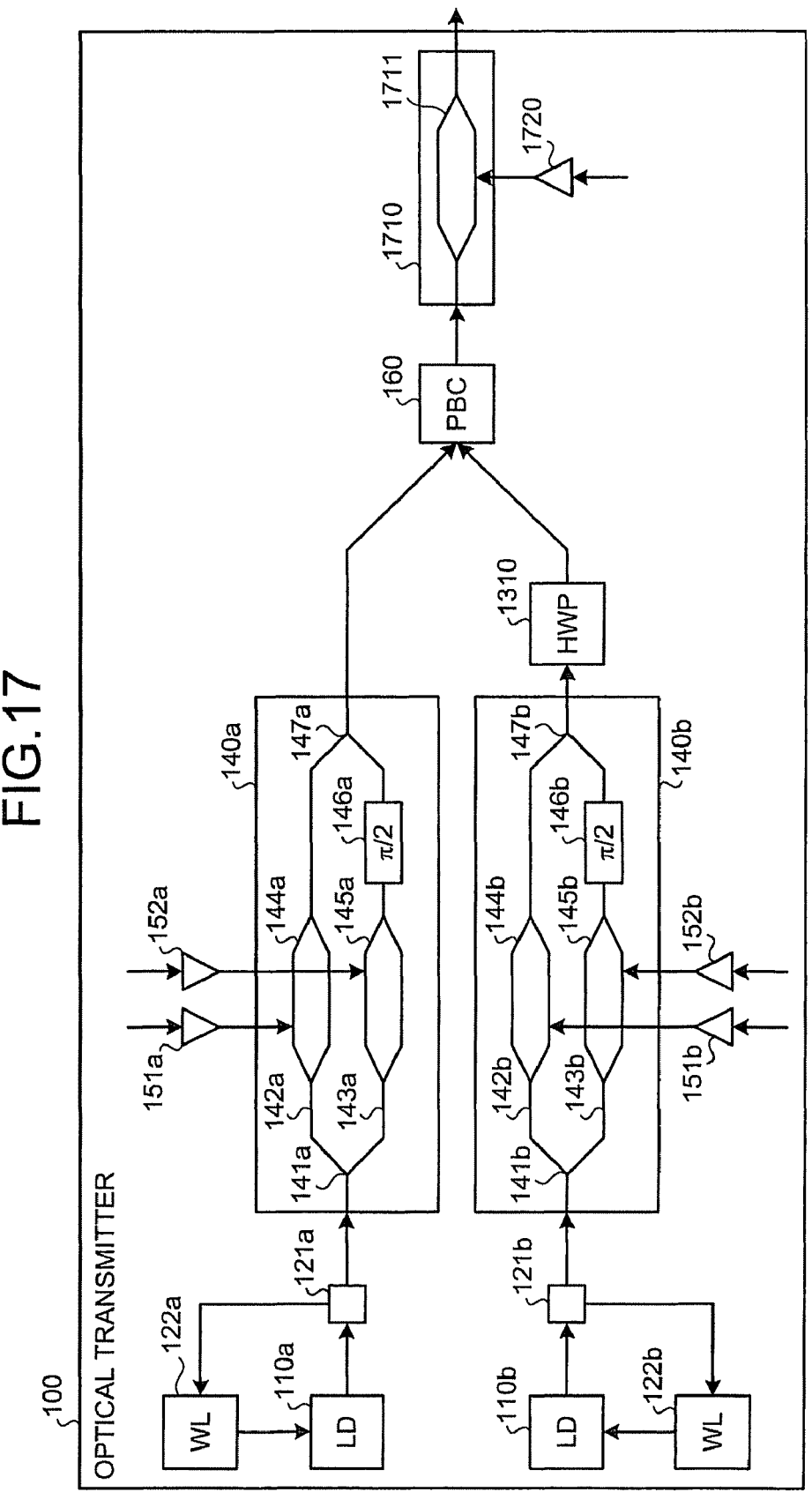
FIG. 17 is a block diagram of a ninth example of another configuration of the optical transmitter depicted in FIG. 1.

FIG. 17 is a block diagram of a ninth example of another configuration of the optical transmitter depicted in FIG. 1. In FIG. 17 components identical to those depicted in FIG. 13 are given the same reference characters used in FIG. 13 and description therefor is omitted herein. As depicted in FIG. 17, the optical transmitter 100 may include in addition to the configuration depicted in FIG. 13, an RZ (return to zero) modulator 1710 and a driving unit 1720, where the polarized beam combiner 160 outputs the combined optical signals to the RZ modulator 1710. The RZ modulator 1710 modulates the optical signal output from the polarized beam combiner 160 to a RZ pulse.

For example, an interferometer 1711 is disposed in the RZ modulator 1710, where the interferometer 1711 braches and combines light transmitted through the RZ modulator 1710. Further, the interferometer 1711 phase modulates one of the branches of light based on a clock signal output from a driving unit. The interferometer 1711 outputs combined light downstream. Thus, the optical signal output from the RZ modulator 1710 is modulated to an RZ pulse. The modulation of the optical signal to an RZ pulse enables sensitivity in receiving the optical signal at the optical receiver 200 to be enhanced. The driving unit 1720 outputs a clock signal to the RZ modulator 1710.

Figure 18:
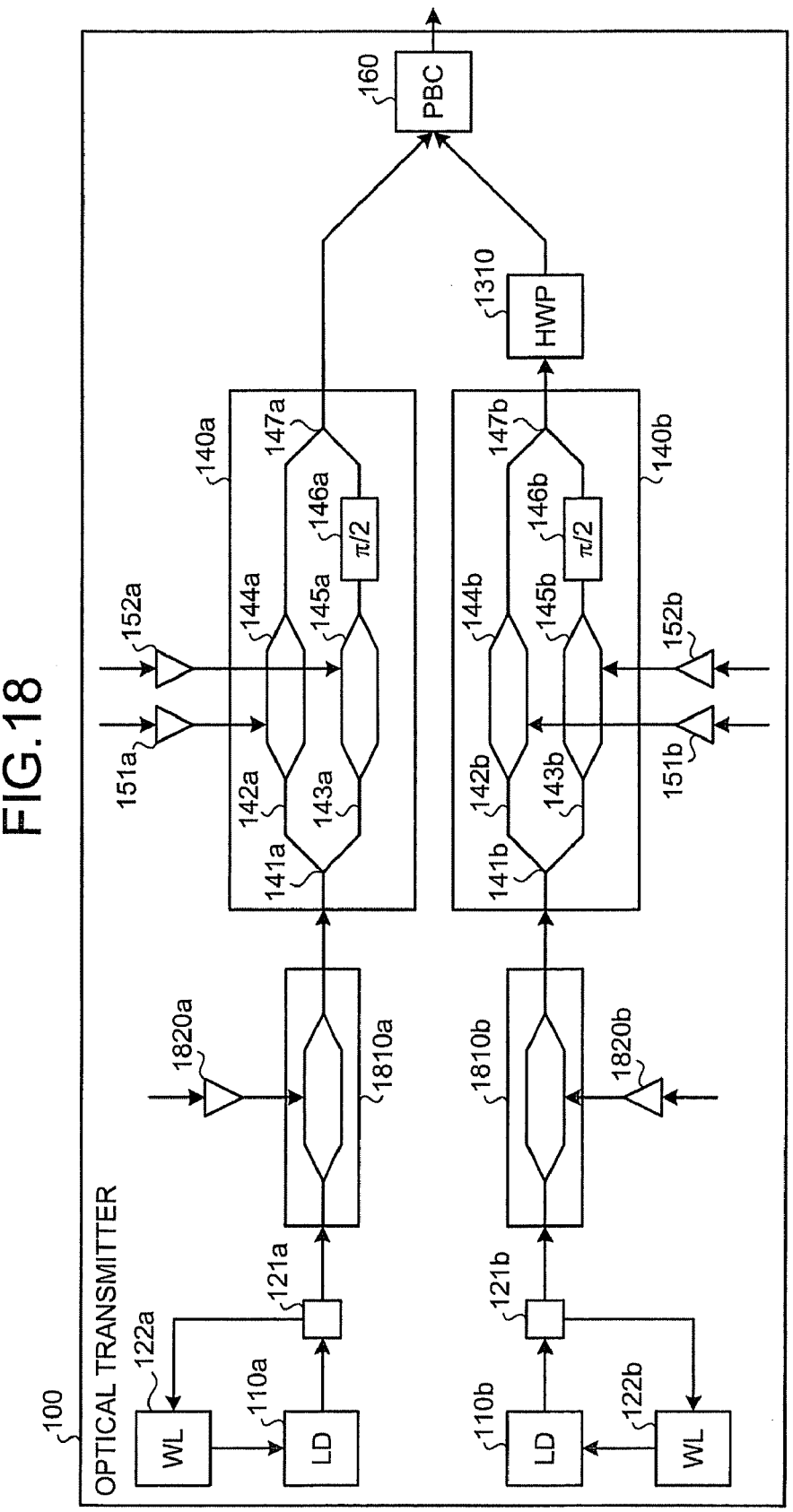
FIG. 18 is a block diagram of a tenth example of another configuration of the optical transmitter depicted in FIG. 1.

FIG. 18 is a block diagram of a tenth example of another configuration of the optical transmitter depicted in FIG. 1. In FIG. 18 components identical to those depicted in FIG. 13 are given the same reference characters used in FIG. 13 and description therefor is omitted herein. As depicted in FIG. 18, the optical transmitter 100 may include in addition to the configuration depicted in FIG. 13, RZ modulators 1810*a* and 1810*b*, and driving units 1820*a* and 1820*b*.

The RZ modulator 1810*a* modulates the light output from the optical branching unit 121*a* to a RZ pulse and outputs the RZ pulse to the phase modulator 140*a*. The RZ modulator 1810*b* modulates the light output from the optical branching unit 121*b* to a RZ pulse and outputs the RZ pulse to the phase modulator 140*b*. The driving unit 1820*a* outputs a clock to the RZ modulator 1810*a* and the driving unit 1820*b* outputs a clock signal to the RZ modulator 1810*b*.

The RZ pulse modulation of the light by the RZ modulator 1810*a* and the RZ modulator 1810*b* is identical to that of the RZ modulator 1710 depicted in FIG. 17 and description therefor is omitted herein. Through the configuration depicted in FIG. 18, the optical signals generated respectively by the phase modulator 140*a* and the phase modulator 140*b* are RZ pulse modulated, thereby enabling the optical signal (DP-QPSK) output from the polarized beam combiner 160 to be RZ pulse modulated.

Figure 19:
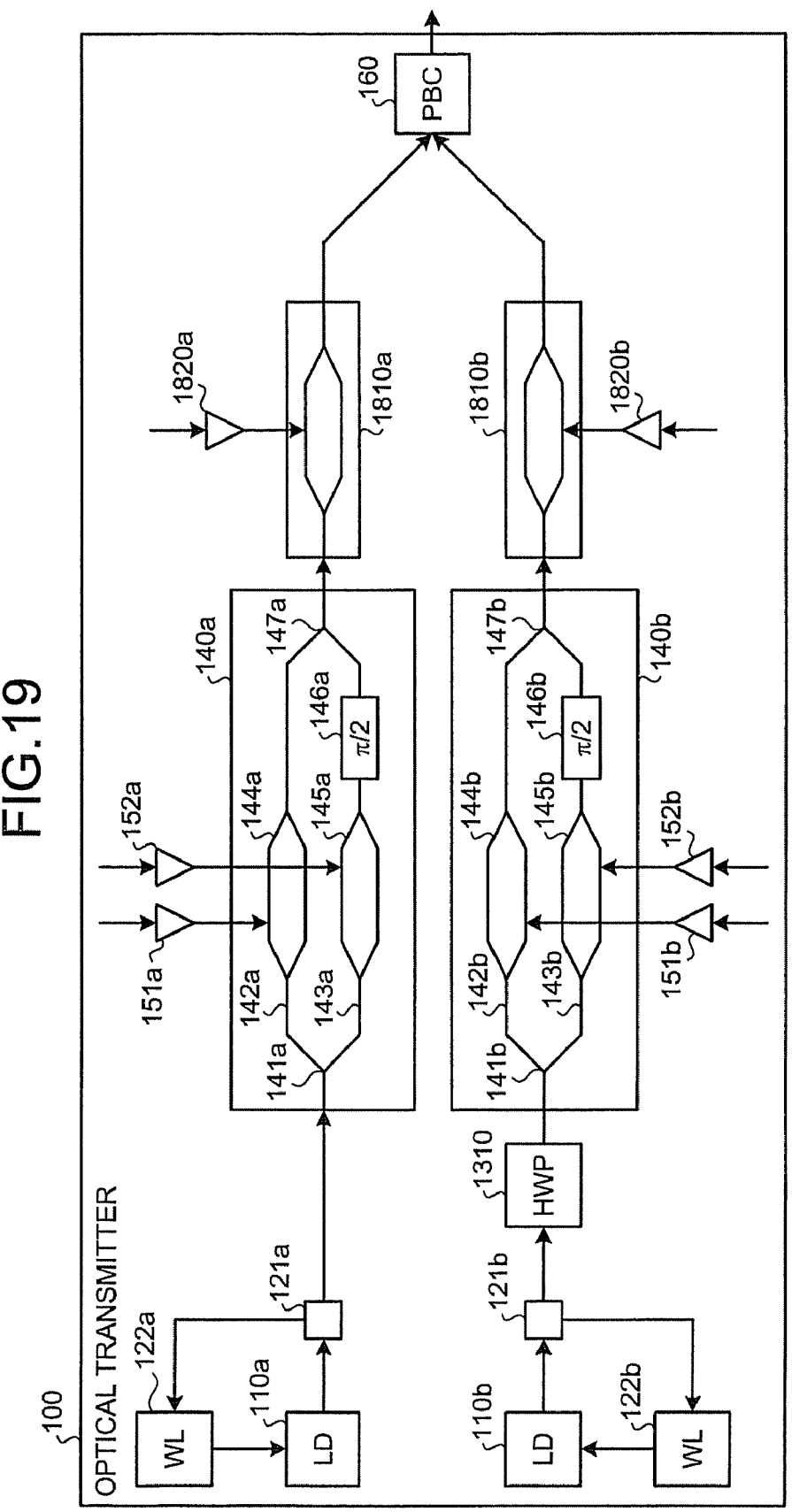
FIG. 19 is a block diagram of an eleventh example of another configuration of the optical transmitter depicted in FIG. 1.

FIG. 19 is a block diagram of an eleventh example of another configuration of the optical transmitter depicted in FIG. 1. In FIG. 19 components identical to those depicted in FIG. 18 are given the same reference characters used in FIG. 18 and description therefor is omitted herein. As depicted in FIG. 19, in the configuration depicted in FIG. 1, the RZ modulator 1810*a* and the driving unit 1820*a* may be disposed between the phase modulator 140*a* and the polarized beam combiner 160. Further, the RZ modulator 1810*b* and the driving unit 1820*b* may be disposed between the phase modulator 140*b* and the polarized beam combiner 160.

In this configuration as well, the optical signal (DP-QPSK) output from the polarized beam combiner 160 can be RZ pulse modulated. Further, in FIG. 19, the HWP 1310 is disposed between the optical branching unit 121*b* and the phase modulator 140*b*. Alternatively, the position of the HWP 1310 may be between the phase modulator 140*b* and RZ modulator 1810*b* or between the RZ modulator 1810*b* and the polarized beam combiner 160.

Figure 20:
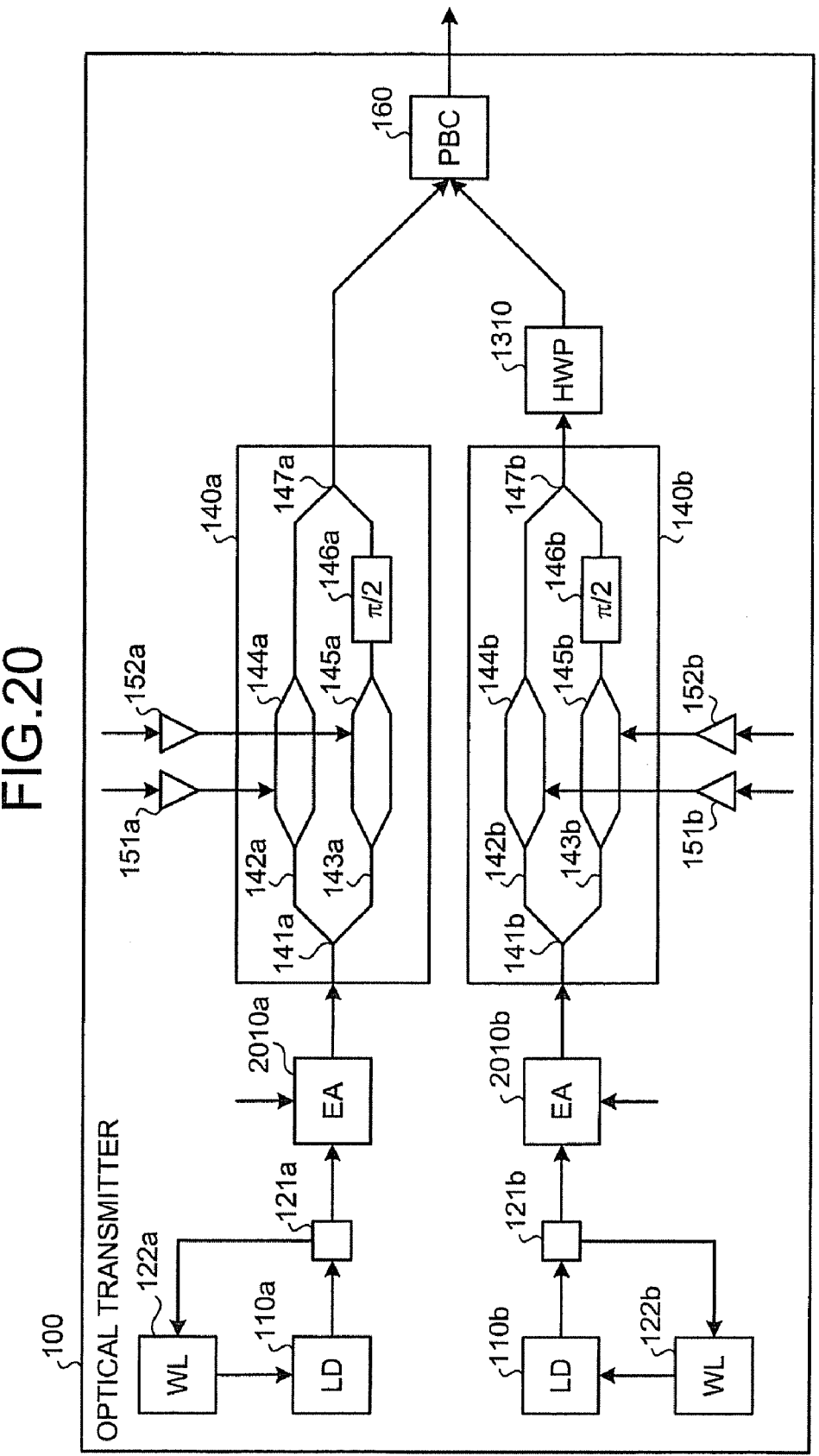
FIG. 20 is a block diagram of a twelfth example of another configuration of the optical transmitter depicted in FIG. 1.

FIG. 20 is a block diagram of a twelfth example of another configuration of the optical transmitter depicted in FIG. 1. In FIG. 20 components identical to those depicted in FIG. 18 are given the same reference characters used in FIG. 18 and description therefor is omitted herein. As depicted in FIG. 20, the optical transmitter 100 may include in place of the RZ modulator 1810*a* and the driving unit 1820*a* in the configuration depicted in FIG. 18, an electro absorption (EA) modulator 2010*a*. Further, the optical transmitter 100 may include in place of the RZ modulator 1810*b* and the driving unit 1820*b*, an EA modulator 2010*b*.

The EA modulator 2010*a* receives the light output from the optical branching unit 121*a* and a clock signal, and modulates the power of the light according to the clock signal; whereby the light is RZ pulse modulated. The EA modulator 2010*a* outputs the RZ pulse to the phase modulator 140*a*. Similarly, the EA modulator 2010*b* RZ pulse modulates the light output from the optical branching unit 121*b* and outputs the RZ pulse to the phase modulator 140*b*.

Thus, by disposing the LD 110*a* and the LD 110*b* to generated light of the polarization X and light of the polarization Y, the respective powers thereof can be sufficiently secured. Consequently, even with application of an EA modulator as a modulator to RZ pulse modulate the light, RZ pulse modulation can be performed with good precision. By adopting an EA modulator, the size of the modulator for RZ pulse modulating the light can be reduced, facilitating a reduction in the size of the optical transmitter 100.

As described, according to the optical transmission system 10, the optical transmitter 100 is equipped with multiple LDs (the LD 110*a* and 110*b*) and from the light output by the LDs, optical signals of respective polarizations is generated. Thus, since optical signals of respective polarizations can be generated without branching the light from the LDs by a splitter, the power of each polarized optical signal can be sufficiently secured and the SNR thereof can be improved.

Further, by disposing the wavelength locker 122a (first wavelength locker) controlling the wavelength of the LD 110a and the wavelength locker 122b (second wavelength locker) controlling the wavelength of the LD 110b in the optical transmitter 100, differences in frequency between the LD 110a and the LD 110b can be reduced at optical transmitter 100. However, if the frequency of the LD 110a and the LD 110b is sufficiently stable, the wavelength lockers 122a and 122b may be omitted from the configuration of the optical transmitter 100.

By implementing an intradyne configuration of the optical receiver 200 to perform digital coherent detection that includes phase estimation for each polarized optical signal, phase shifting occurring between the LDs at the optical transmitter 100 can be compensated at the optical receiver 200. Thus, at the optical receiver 200, the optical signals can be received with good sensitivity without disposing OPLLs for each polarized optical signal. Consequently, the optical receiver 200, without having a large size, can improve the quality of optical transmissions from the optical transmitter 100 to the optical receiver 200.

For example, as depicted by the configurations in FIGS. 2 to 4, at the optical receiver 200, even if one local oscillator (the local oscillator 212) is disposed for the polarized optical signals, the optical signals can be received with good sensitivity. Further, in a configuration of the optical receiver 200 having one local oscillator 212, for example, as depicted in FIGS. 4 and 5, the frequency difference between the light from the local oscillator 212 and each optical signal separated by the first PBS 211 is calculated and based on the calculated frequency difference, the frequency of the light from the local oscillator 212 is controlled, thereby enabling the frequency difference between the polarized optical signals to be compensated to a certain extent.

In a configuration of the optical receiver 200 having one local oscillator 212, the quality of each optical signal, phase separated by the first PBS 211, is measured and the frequency of the light from the local oscillator 212 is controlled such that the sum of the measured qualities becomes large and thus, each polarization of light can be received at maximum quality. Alternatively, the frequency of the light from the local oscillator 212 can be controlled such that the difference between the measured qualities becomes small and thus, each polarized optical signal can be received at equivalent qualities.

Further, for example, as depicted in FIG. 9, the optical transmitter 100 may be configured to monitor the power of the light output by the phase modulators 140a and 140b, and based on the monitored power, control the power of the light output by the LD 110a and the LD 110b. Thus, differences in optical loss at components generating the polarized optical signals at the optical transmitter 100 can be reduced at the optical transmitter 100, thereby enabling the power of each polarized optical signal to be equivalent and consequently, the SNR thereof can be made equivalent.

In the embodiments, a configuration adopting a QPSK modulator (phase modulator 140a and phase modulator 140b) as the phase modulator of the optical transmitter 100 is described, however, the phase modulator is not limited a QPSK scheme. A differential QPSK (DQPSK) or binary PSK (BPSK) modulator may be adopted.

According to the configurations above, through a disposal of the first light source and the second light source in the optical transmitter, the power of each polarized optical signal is secured and phases differences between light sources at the optical transmitter can be compensated by phase estimation for each polarized optical signal in the digital coherent detection at the optical receiver.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission system comprising:
   an optical transmitter that includes:
      a first and a second light source,
      a first phase modulator that modulates light from the first light source,
      a second phase modulator that modulates light from the second light source, and
      a polarized beam combiner that combines the light output from the first phase modulator and the light output from the second phase modulator into an optical signal and outputs the optical signal; and
   an optical receiver that includes:
      a local oscillator,
      a polarization beam splitter that splits, according to polarization, the optical signal transmitted from the optical transmitter, and
      a first and a second digital coherent receiver respectively corresponding to the first phase modulator and the second phase modulator, and including a frontend that mixes light from the oscillator and the optical signal split according to polarization by the polarization beam splitter to output an electrical signal of a real part and an imaginary part,
      an analog-digital converter that converts the electrical signal of the real part and the imaginary part output from the frontend to a digital signal, and
      a digital signal processor that performs phase estimation with respect to the digital signal and extracts a signal, wherein
   the first and the second digital coherent receivers respectively calculate a difference in frequency between the optical signal from the local oscillator and the light split according to polarization,
   the optical receiver, based on the differences in frequency calculated respectively by the first and the second digital coherent receivers, controls the frequency of the light from the local oscillator.

2. The optical transmission system according to claim 1, wherein the optical transmitter further includes:
   a first wavelength locker that controls wavelength of the light output from the first light source to be constant, and
   a second wavelength locker that controls wavelength of the light output from the second light source to be constant.

3. The optical transmission system according to claim 1, wherein the optical transmitter further includes:
   a first power monitor that monitors power of the light output from the first phase modulator,
   a second power monitor monitoring power of the light output from second phase modulator,
   a first power controller that controls the power of the light output from the first light source, based on the power monitored by the first power monitor, and
   a second power controller that controls the power of the light output from the second light source, based on the power monitored by the second power monitor.

4. The optical transmission system according to claim 1, wherein
the optical transmitter further comprises a modulator that modulates the optical signal transmitted to the optical receiver to a return-to-zero pulse.

5. An optical transmission system comprising:
an optical transmitter that includes:
a first and a second light source,
a first phase modulator that modulates light from the first light source,
a second phase modulator that modulates light from the second light source, and
a polarized beam combiner that combines the light output from the first phase modulator and the light output from the second phase modulator into an optical signal and outputs the optical signal; and
an optical receiver that includes:
a local oscillator,
a polarization beam splitter that splits, according to polarization, the optical signal transmitted from the optical transmitter, and
a first and a second digital coherent receiver respectively corresponding to the first phase modulator and the second phase modulator, and including a frontend that mixes light from the oscillator and the optical signal split according to polarization by the polarization beam splitter to output an electrical signal of a real part and an imaginary part,
an analog-digital converter that converts the electrical signal of the real part and the imaginary part output from the frontend to a digital signal, and
a digital signal processor that performs phase estimation with respect to the digital signal and extracts a signal, wherein
the first and the second digital coherent receivers respectively measure quality of the optical signal split according to polarization,
the optical receiver controls the frequency of the light from the local oscillator so that a sum of the qualities respectively measured by the first and the second digital coherent receivers increases.

6. The optical transmission system according to claim 5, wherein
the optical transmitter further includes:
a first wavelength locker that controls wavelength of the light output from the first light source to be constant, and
a second wavelength locker that controls wavelength of the light output from the second light source to be constant.

7. The optical transmission system according to claim 5, wherein
the optical transmitter further includes:
a first power monitor that monitors power of the light output from the first phase modulator,
a second power monitor monitoring power of the light output from second phase modulator,
a first power controller that controls the power of the light output from the first light source, based on the power monitored by the first power monitor, and
a second power controller that controls the power of the light output from the second light source, based on the power monitored by the second power monitor.

8. The optical transmission system according to claim 5, wherein
the optical transmitter further comprises a modulator that modulates the optical signal transmitted to the optical receiver to a return-to-zero pulse.

9. An optical transmission system comprising:
an optical transmitter that includes:
a first and a second light source,
a first phase modulator that modulates light from the first light source,
a second phase modulator that modulates light from the second light source, and
a polarized beam combiner that combines the light output from the first phase modulator and the light output from the second phase modulator into an optical signal and outputs the optical signal; and
an optical receiver that includes:
a local oscillator,
a polarization beam splitter that splits, according to polarization, the optical signal transmitted from the optical transmitter, and
a first and a second digital coherent receiver respectively corresponding to the first phase modulator and the second phase modulator, and including a frontend that mixes light from the oscillator and the optical signal split according to polarization by the polarization beam splitter to output an electrical signal of a real part and an imaginary part,
an analog-digital converter that converts the electrical signal of the real part and the imaginary part output from the frontend to a digital signal, and
a digital signal processor that performs phase estimation with respect to the digital signal and extracts a signal, wherein
the first and the second digital coherent receiver respectively measure quality of the optical signal split according to polarization,
the optical receiver controls the frequency of the light from the local oscillator so that difference between the qualities respectively measured by the first and the second digital coherent receivers decreases.

10. The optical transmission system according to claim 9, wherein
the optical transmitter further includes:
a first wavelength locker that controls wavelength of the light output from the first light source to be constant, and
a second wavelength locker that controls wavelength of the light output from the second light source to be constant.

11. The optical transmission system according to claim 9, wherein
the optical transmitter further includes:
a first power monitor that monitors power of the light output from the first phase modulator,
a second power monitor monitoring power of the light output from second phase modulator,
a first power controller that controls the power of the light output from the first light source, based on the power monitored by the first power monitor, and
a second power controller that controls the power of the light output from the second light source, based on the power monitored by the second power monitor.

12. The optical transmission system according to claim 9, wherein
the optical transmitter further comprises a modulator that modulates the optical signal transmitted to the optical receiver to a return-to-zero pulse.

* * * * *